(12) United States Patent
Schweizer

(10) Patent No.: US 12,703,931 B2
(45) Date of Patent: Aug. 11, 2026

(54) FIBER

(71) Applicant: OceanSafe AG, Bern (CH)

(72) Inventor: Manuel Schweizer, Bern (CH)

(73) Assignee: OceanSafe AG, Bern (CH)

( * ) Notice: Subject to any disclaimer, the term of this patent is extended or adjusted under 35 U.S.C. 154(b) by 147 days.

(21) Appl. No.: 18/690,061

(22) PCT Filed: Sep. 9, 2022

(86) PCT No.: PCT/EP2022/075084
§ 371 (c)(1),
(2) Date: Mar. 7, 2024

(87) PCT Pub. No.: WO2023/036919
PCT Pub. Date: Mar. 16, 2023

(65) Prior Publication Data

US 2024/0384443 A1 Nov. 21, 2024

(30) Foreign Application Priority Data

Sep. 10, 2021 (EP) .................................... 21196170

(51) Int. Cl.

| | |
|---|---|
| ***D01F 6/92*** | (2006.01) |
| ***C08L 67/02*** | (2006.01) |
| ***D01D 5/088*** | (2006.01) |
| ***D01D 5/20*** | (2006.01) |
| ***D01D 5/24*** | (2006.01) |

(52) U.S. Cl.
CPC ................ *D01F 6/92* (2013.01); *C08L 67/02* (2013.01); *D01D 5/088* (2013.01); *D01D 5/20* (2013.01); *D01D 5/24* (2013.01); *C08L 2203/12* (2013.01); *C08L 2205/025* (2013.01); *C08L 2205/035* (2013.01); *D10B 2331/04* (2013.01); *D10B 2401/022* (2013.01); *D10B 2401/12* (2013.01)

(58) Field of Classification Search
CPC .......... D01D 1/05; D01D 1/247; D01D 5/088; D01D 5/20; D01D 5/24; D01F 6/92; D01F 6/625; C08L 67/02; C08L 2205/025; C08L 2205/035; C08L 2203/12; D10B 2331/04; D10B 2401/022; D10B 2401/12
USPC .......................................................... 428/399
See application file for complete search history.

(56) References Cited

U.S. PATENT DOCUMENTS

2019/0071801 A1 3/2019 Allen, Jr.

FOREIGN PATENT DOCUMENTS

| | | |
|---|---|---|
| CN | 103668541 | 3/2014 |
| GB | 1359471 | 7/1974 |
| JP | 2018159142 | * 10/2018 |

* cited by examiner

*Primary Examiner* — Camie S Thompson
(74) *Attorney, Agent, or Firm* — Riverside Law LLP

(57) ABSTRACT

The present invention relates to a fiber obtainable or being obtained by a method comprising:

spinning a melt comprising an aliphatic polyester, an aliphatic-aromatic polyester, and a polyhydroxyalkanoate through a hollow fiber spinning nozzle to obtain a precursor fiber; and cooling the precursor fiber under a temperature gradient, thereby obtaining the fiber.

The invention also relates to yarns and clothings made from such fiber and to methods of preparing such fiber.

19 Claims, 13 Drawing Sheets

FIBER

CROSS-REFERENCE TO RELATED APPLICATIONS

The present application is a U.S. National Phase Application filed under 35 U.S.C. § 371 claiming benefit to PCT International Application No. PCT/EP2022/075084, filed Sep. 9, 2022, which claims priority to European Patent Application No. 21196170.1, filed Sep. 10, 2021, the contents of which are incorporated by reference herein in their entireties.

TECHNICAL FIELD

The present invention relates to a fiber comprising an aliphatic polyester, an aliphatic-aromatic polyester and a polyhydroxyalkanoate, methods for preparing such fiber, and uses of such fiber in a yarn or a textile.

BACKGROUND

Sustainable textiles should be based on ecological, economic and social sustainability. A sustainable product should take these factors into account from raw material to processing, finishing, sales and recycling.

Fibers used in sustainable textiles today include, e.g., natural fibers such as cotton, wool, linen, SeaCell™ (a cellulose fiber obtained from algae, which is produced from Smartfiber AG), recycled fibers such as recycled polyester (e.g. from polyethylene terephthalate (PET) bottles), Econyl® (a recycled nylon fiber), or regenerated fibers (regenerated fibers is a designation for fibers which are prepared from a natural material, such as wood, by a chemical process) such as Lyocell (e.g., known under the tradename Tencel™ from Lenzing) or Modal.

However, although these fibers are used in sustainable textiles, there are still various drawbacks. For example, cotton and wool production requires high water consumption and is associated with high land consumption. Obtaining recycled fibers, such as e.g. recycled PET, usually requires high amounts of energy, water and chemicals.

It is further desirable that sustainable textiles and fibers are suitable for being used under the concept of a circular economy. In particular, it is desirable that textiles and fibers can be used in the biological cycle, e.g. under the cradle-to-cradle design, by exhibiting suitable biodegradability and thus avoiding non-degradable waste. A beneficial guidance of a fiber or textile into the biological cycle is achieved when the textile product is returned after expiry of its life cycle and fed to industrial composting. This produces biomass and biogas ($CH_4$, $CO_2$, water), which can be fed directly into the biological cycle.

Thus, there is an ongoing need for fibers which, in particular, address ecological requirements. It is thus an object of the invention to provide such a fiber.

SUMMARY

This object is accomplished by the fiber, the yarn, the clothing and the methods having the features of the independent claims.

In a first aspect, the present invention relates to a fiber obtainable or being obtained by a method comprising:

- spinning a melt comprising an aliphatic polyester, an aliphatic-aromatic polyester, and a polyhydroxyalkanoate through a hollow fiber spinning nozzle to obtain a precursor fiber; and
- cooling the precursor fiber under a temperature gradient, thereby obtaining the fiber.

In a second aspect, the present invention relates to a fiber being made from a mixture comprising an aliphatic polyester, an aliphatic-aromatic polyester, and a polyhydroxyalkanoate, wherein the fiber comprises, in a longitudinal direction, two kinds of portions, wherein the one kind of portions are thicker portions and the other kind of portions are thinner portions, wherein said thicker portions and thinner portions extend in a vertical direction relative to the longitudinal direction of the fiber, and wherein an extension in the vertical direction of a thicker portion is greater than an extension in the vertical direction of a thinner portion;

- wherein at least a part of the thicker portions has a cavity, and at least a part of the thinner portions has a compact structure.

In a third aspect, the present invention relates to a hollow fiber being made from a mixture comprising an aliphatic polyester, an aliphatic-aromatic polyester, and a polyhydroxyalkanoate.

In a fourth aspect, the present invention relates to a yarn comprising a fiber of the invention.

In a fifth aspect, the present invention relates to a textile comprising a fiber of the invention or a yarn of the invention.

In a sixth aspect, the present invention relates to a method of preparing a fiber according to the invention, comprising:

- spinning a melt comprising an aliphatic polyester, an aliphatic-aromatic polyester, and a polyhydroxyalkanoate through a hollow fiber spinning nozzle to obtain a precursor fiber; and
- cooling the precursor fiber under a temperature gradient, thereby obtaining the fiber.

In a seventh aspect, the present invention relates to the use of a melt comprising an aliphatic polyester, an aliphatic-aromatic polyester, and a polyhydroxyalkanoate for the preparation of a fiber, wherein the fiber is as defined herein.

In an eight aspect, the present invention relates to the use of a melt comprising an aliphatic polyester, an aliphatic-aromatic polyester, and a polyhydroxyalkanoate for the preparation of a hollow fiber.

In a ninth aspect, the present invention relates to a mixture comprising an aliphatic polyester, an aliphatic-aromatic polyester, and a polyhydroxyalkanoate.

In a tenth aspect, the present invention relates to the use of a mixture comprising an aliphatic polyester, an aliphatic-aromatic polyester, and a polyhydroxyalkanoate for the preparation of a fiber, wherein the fiber is as defined herein.

In an eleventh aspect, the present invention relates to the use of a mixture comprising an aliphatic polyester, an aliphatic-aromatic polyester, and a polyhydroxyalkanoate for the preparation of a hollow fiber.

BRIEF DESCRIPTION OF THE DRAWINGS

The invention will be better understood with reference to the detailed description when considered in conjunction with the non-limiting examples and the drawings, in which.

DETAILED DESCRIPTION

Figure 1:
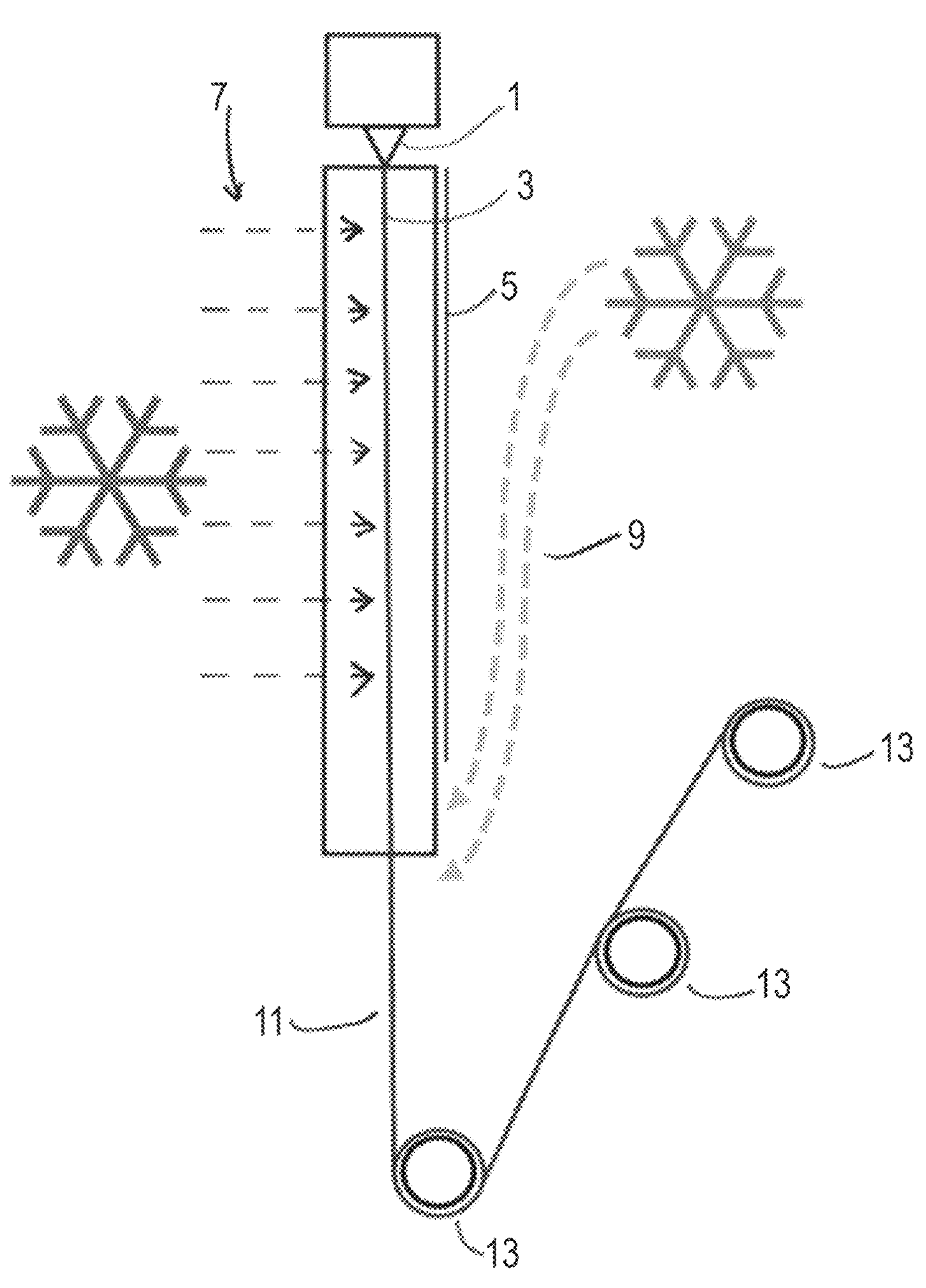
FIG. 1 shows a schematic representation of a melt spinning apparatus for preparing a fiber according to an embodiment of the invention, where a precursor fiber is colled under a temperature gradient.

As set out above, in a first aspect the present invention relates to a fiber obtainable or being obtained by a method comprising:

spinning a melt comprising an aliphatic polyester, an aliphatic-aromatic polyester, and a polyhydroxyalkanoate through a hollow fiber spinning nozzle to obtain a precursor fiber; and cooling the precursor fiber under a temperature gradient, thereby obtaining the fiber.

It has been surprisingly found that a fiber, which is obtainable or being obtained by a method comprising spinning a melt comprising an aliphatic polyester, an aliphatic-aromatic polyester, and a polyhydroxyalkanoate through a hollow fiber spinning nozzle to obtain a precursor fiber; and cooling the precursor fiber under a temperature gradient to obtain the fiber, has equal to better moisture absorption properties compared with cotton (see Example 3 herein below). In other words, the fiber of the present invention has a similar hydrophilicity as cotton. It has also been surprisingly found that the time required for drying of the fiber of the invention is significantly shorter than for cotton (see Example 3). Accordingly, a fiber of the invention can be used, for example, to produce surfaces, in particular textiles, that absorb moisture and allow it to dry again with less energy than required for cotton. Thus, as an advantage, the fiber of the present invention has similar or even better properties with regard to hydrophilicity and drying behavior compared with cotton. However, as a significant further advantage, at the same time the preparation of the fiber requires a much lower water and land consumption than cotton (see Example 4). As yet a further advantage, the production of the fiber can be carried out without toxic substances, such as e.g. antimony (see Example 2). Further, by using an aliphatic polyester, aliphatic-aromatic polyester, and a polyhydroxyalkanoate, a fiber can be obtained which is biodegradable and even meets the harmonised European standard, EN 13432 and can thus be treated in industrial composting plants. Fibers of the invention can be used as textile fibers, e.g. for producing clothing such as a shirt (see Example 5 and FIGS. 9A, 9B and 9C). It has been found here that such clothing is biodegradable even to such an extent that such a piece of clothing is fully degraded/decomposed within only a couple of weeks after being put into organic waste. In this context it is noted that various products, such as e.g. plates and foils, but also fibers, which comprise one or more of an aliphatic polyester, aliphatic-aromatic polyester, and/or a polyhydroxyalkanoate are described, e.g., in EP 3 626 767, WO 2010/034689, WO 2010/034711, WO 2015/169660, EP 1 966 419, EP 2 984 138, CN 103668540, CN 103668541, WO 2014/173055 and CN 104120502. However, these documents describe only conventional processing methods of these polymers.

The term "precursor fiber", as used herein, in general refers to a fiber that occurs as intermediate during the manufacturing process of the present invention after leaving the hollow fiber spinning nozzle and during the cooling under the temperature gradient. The (final) fiber of the present invention that is obtainable or being obtained by the method, in particular after the cooling under the temperature gradient, is in general referred to as just a "fiber".

It has been also surprisingly found here that a fiber, which is obtainable or being obtained by a method comprising spinning a melt comprising an aliphatic polyester, an aliphatic-aromatic polyester, and a polyhydroxyalkanoate through a hollow fiber spinning nozzle to obtain a precursor fiber; and cooling the precursor fiber under a temperature gradient to obtain the fiber, has a specific structure comprising thicker and thinner portions, wherein the thicker portions may have cavities, and wherein the thinner portions may have a compact or condensed structure. Accordingly, the present invention also relates to a fiber being made from a mixture comprising an aliphatic polyester, an aliphatic-aromatic polyester, and a polyhydroxyalkanoate, wherein the fiber comprises, in a longitudinal direction, two kinds of portions, wherein the one kind of portions are thicker portions and the other kind of portions are thinner portions, wherein said thicker portions and thinner portions extend in a vertical direction relative to the longitudinal direction of the fiber, and wherein an extension in the vertical direction of a thicker portion is greater than an extension in the vertical direction of a thinner portion;

wherein at least a part of the thicker portions has a cavity, and at least a part of the thinner portions has a compact structure. As the fiber comprises thicker portions with cavities and thinner portions with a compact structure, the fiber may be also denoted as a segmented fiber, or as a segmented hollow fiber. A fiber according to an embodiment of the invention having thicker portions with cavities and thinner portions is shown, e.g., in FIGS. 5A and 5B (thicker portions 15, thinner portions 17 and cavities 19). Without wishing to be bound by theory, it is assumed herein that this structure comprising thicker portions with cavities and thinner portions having a compact structure results from the partial fusion of adjacent hollow fiber portions during the cooling of the precursor fiber under a temperature gradient.

As used herein, the term "cavity" in general denotes a hollow space which is present within the cross-section of the fiber, such as e.g. shown in FIGS. 5A, 5B, 5D, 5E upper panel and lower panel in the middle, and 5F. The cavity may be filled with a gas, such as e.g. with air. The term "compact structure", which may be also referred to as a "condensed structure", in general denotes that the material of the fiber is present in a substantially dense or condensed form, in particular when compared to a cavity of the fiber, such as e.g. the structures shown in FIG. 5E, lower panel on the left and the right. The term "compact structure" or "condensed structure", however, may also include that the respective structure contains pore(s), such as e.g. shown in FIG. 5E, lower panel on the left and the right.

A melt for spinning the fiber can be produced using any method for producing a melt for spinning a fiber which is known to a person skilled in the art. As an illustrative example, the aliphatic polyester, aliphatic-aromatic polyester and polyhydroxyalkanoate can be mixed in the unmolten state, e.g. by mixing granules of the polymers, optionally with addition of one or more further additives. Optionally, the polymers and, if present, the additive(s) may be dried before the mixing and the preparation of the melt. Then, for preparing the melt, the mixture can be heated to or above the melting point(s) of the polymers. As an illustrative example, the mixing and heating may be carried out in an extruder. As an illustrative example, the melt may be heated to a temperature of 250° C. The melt is then passed through a hollow fiber spinning nozzle. As an illustrative example, an extruder may be used for passing the melt through the hollow fiber spinning nozzle. Any hollow fiber spinning nozzle generally known in the art may be used, such as e.g. a hollow fiber spinning nozzle as described in EP 2 112 256, the whole content of which is hereby incorporated by reference. By spinning a melt comprising an aliphatic aliphatic aromatic polyester, and a polyhydroxyalkanoate through a hollow fiber spinning nozzle, a hot precursor fiber is obtained. The hot precursor fiber, which is obtained by spinning the melt through the hollow fiber spinning nozzle, is cooled under a temperature gradient, thereby obtaining the fiber.

The temperature gradient may be generated by any suitable means/devices that are able to create a temperate gradient which is used in the present invention. The temperature gradient may, for example, be generated by one or more temperature control elements. As illustrative examples, the temperature gradient can be generated by arranging and/or operating temperature control elements within the spinning apparatus or the vicinity of the spinning apparatus. Apparatuses for melt spinning are generally known to a person skilled in the art (see e.g. also FIGS. 2A and 2B, which show conventional melt spinning apparatuses). The temperature control elements can be heating and/or cooling elements which can either actively or passively provide a heating or cooling effect to the precursor fiber. By means of such temperature control elements, it is possible to e.g. cool one selected side/surface area of the precursor fiber such that one side/surface area of the precursor fiber is, for example, cooled, while another surface area, typically the surface area that is opposed to the selected side/surface area, is heated or at least maintained at a temperature at which it exists after leaving the nozzle of the spinning apparatus. An illustrative, but non-limiting example for a temperature control element, which is a cooling element, is an air cooling aggregate. As an illustrative example for a temperature gradient, the precursor fiber may leave the spinning nozzle at a temperature of about 250° C. The temperature gradient may then be generated, for example, by air cooling of the precursor fiber from one side. Accordingly, air cooling may be effected by providing an air flow onto the precursor fiber from only one side of the precursor fiber, in a substantially vertical direction relative to a longitudinal direction of the precursor fiber, by using an air cooling aggregate arranged on the one side of the precursor fiber (see, e.g., FIG. 1, precursor fiber 3 and air flow 7). The air used for the air cooling may have ambient temperature, preferably room temperature, more preferably a temperature of +20° C.+/−5° C.

The one or more temperature control elements may be arranged so that the temperature gradient is generated in a substantially vertical direction relative to a longitudinal direction of the precursor fiber. It is equally suitable that the one or more temperature control elements are arranged so that the temperature gradient is generated in a substantially parallel direction relative to a cross-section of the precursor fiber.

Preferably, the one or more temperature control elements are arranged so that a temperature on an outer surface of the precursor fiber is lower than a temperature on an opposite outer surface. In particular, the one or more temperature control elements may be arranged so that the precursor fiber is cooled from one side. Preferably, the cooling is effected by air cooling. Preferably, air cooling may be effected by providing an air flow onto the precursor fiber from one side, in a substantially vertical direction relative to a longitudinal direction of the precursor fiber, by using an air cooling aggregate arranged on the one side of the precursor fiber (see, e.g., FIG. 1, precursor fiber 3 and air flow 7). An air flow from an opposite side to the one side may be prevented by switching off an air cooling aggregate arranged on the opposite side of the precursor fiber. It is also possible to prevent an air flow from an opposite side to the one side by arranging one or more baffles between an air cooling aggregate arranged on an opposite side of the precursor fiber and the precursor fiber (see, e.g. FIG. 1, precursor fiber 3, baffle 5 and air flow 9). Accordingly, by arranging one or more baffles between the precursor fiber and the air cooling aggregate arranged on the opposite side, i.e. the air cooling aggregate which is arranged on the side opposite to the one side from which the air flow onto the precursor fiber is provided, an air flow from the opposite side onto the precursor fiber can be prevented at least over a portion along the longitudinal direction of the precursor fiber.

The term "aliphatic polyester" as used herein in general refers to a polyester which is typically synthesized through a condensation polymerization of an aliphatic diol and an aliphatic dicarboxylic acid or an anhydride thereof. As an illustrative example, the aliphatic polyester as used herein may comprise an aliphatic $C_2$-$C_{20}$ dicarboxylic acid and an aliphatic $C_2$-$C_{12}$ diol. Preferably, the aliphatic diol is an aliphatic $C_2$-$C_8$ diol. More preferably, the aliphatic diol is an aliphatic $C_2$-$C_6$ diol. Even more preferably, the aliphatic diol is an aliphatic $C_3$ diol or an aliphatic $C_4$ diol. Aliphatic diols used in the aliphatic polyester may include, as illustrative examples, ethylene glycol, propylene glycol, 1,3-propanediol, 1,3-butanediol, 1,4-butanediol, 1,5 pentanediol, and 1,6-hexanediol. Preferably, the aliphatic diol is 1,3-propanediol or 1,4-butanediol. More preferably, the aliphatic diol is 1,4-butanediol. Preferably, the aliphatic dicarboxylic acid is an aliphatic $C_2$-$C_{12}$ dicarboxylic acid. More preferably, the aliphatic dicarboxylic acid is an aliphatic $C_2$-$C_8$ dicarboxylic acid, even more preferably an aliphatic $C_4$ dicarboxylic acid. Aliphatic dicarboxylic acids used in the aliphatic polyester may include, as illustrative examples, oxalic acid, malonic acid, succinic acid, glutaric acid, and adipic acid. Preferably, the aliphatic dicarboxylic acid is malonic acid or succinic acid. More preferably, the aliphatic dicarboxylic acid is succinic acid. Optionally, when the dicarboxylic acid is an aliphatic $C_2$-$C_{12}$ dicarboxylic acid, the aliphatic polyester may further comprise an additional aliphatic $C_6$-$C_{20}$ dicarboxylic acid, which is different from the $C_2$-$C_{12}$ dicarboxylic acid. The optional aliphatic $C_6$-$C_{12}$ dicarboxylic acids may include, as illustrative examples, adipic acid, suberic acid, azelaic acid, sebacic acid, brassylic acid and arachidonic acid. Preferably, the optional aliphatic $C_6$-$C_{12}$ dicarboxylic acids may include adipic acid, suberic acid, azelaic acid, sebacic acid and brassylic acid. The optional aliphatic $C_2$-$C_{12}$ dicarboxylic acid may be present in the aliphatic polyester at a ratio of from 0 to 10 mol-%, based on 100 mol-% of the total amount of aliphatic dicarboxylic acids in the aliphatic polyester. Optionally, the aliphatic polyester may further comprise a chain extender and/or a branching agent. Optional chain extenders and/or branching agents may include, as illustrative examples, a polyfunctional isocyanate, isocyanurate, oxazoline, carboxylic anhydride such as e.g. maleic anhydride, epoxide (in particular an epoxy-containing poly(meth)acrylate), an at least trihydric alcohol, and an at least tribasic carboxylic acid. The optional chain extender and/or branching agent may be present in the aliphatic polyester at a ratio of from 0 to 1% by weight based on 100% by weight of the combined amount of aliphatic dicarboxylic acid(s) and aliphatic diol. The term "aliphatic polyester" may also include a mixture of two or more different aliphatic polyesters. The aliphatic polyester may have a number average molecular weight (Mn) ranging from 2,500 to 150,000 g/mol, preferably from 5,000 to 100,000 g/mol, more preferably from 7,500 to 75,000 g/mol, still more preferably from 10,000 to 65,000 g/mol, even more preferably from 12,000 to 60,000 g/mol. The aliphatic polyester may have a weight average molecular weight (Mw) ranging from 5,000 to 300,000 g/mol, preferably from 10,000 to 250,000 g/mol, more preferably from 20,000 to 220,000 g/mol, still more preferably from 50,000 to 200,000 g/mol, even more preferably from 60,000 to 190,000 g/mol. The aliphatic polyester may have a polydispersity index (i.e. the ratio of the weight average molecular weight to the number average molecular weight (Mw/Mn)) ranging from 1 to 6, preferably from 1 to 4, more preferably from 1.0 to 3.0, still more preferably from 1.2 to 2.0, even more preferably from 1.4 to 1.8.

Illustrative examples of aliphatic polyesters, which can be used in the present invention, may include an aliphatic polyester selected from the group consisting of a polybutylene succinate (PBS), a polyethylene oxalate, a polyethylene malonate, a polyethylene succinate, a polypropylene oxalate, a polypropylene malonate, a polypropylene succinate, a polybutylene oxalate, a polybutylene malonate, a polybutylene succinate-co-adipate (PBSA), a polybutylene succinate-co-azelate (PBSAz), a polybutylene succinate-co-brassylate (PBSBr), and any combination thereof. The aliphatic polyester may preferably be selected from the group consisting of a polybutylene succinate (PBS), a polybutylene succinate-co-adipate (PBSA), a polybutylene succinate-co-azelate (PBSAz), a polybutylene succinate-co-brassylate (PBSBr), and any combination thereof. In one preferred embodiment, the aliphatic polyester is a polybutylene succinate. The term "polybutylene succinate" as used herein in particular denotes a condensation product from the aliphatic dicarboxylic acid succinic acid and the aliphatic diol 1,4-butanediol. The aliphatic polyesters polybutylene succinate (PBS) and polybutylene succinate-co-adipate (PBSA) are commercially available, for example, from Showa Highpolymer as Blanche®, and by Mitsubishi as GSPIa®. The aliphatic polyester, in particular polybutylene succinate (PBS), may be obtained from renewable resources or from fossil resources. Preferably, an aliphatic polyester from renewable resources is used. More preferably, bio-based polybutylene succinate (PBS) produced from bio-based succinic acid and 1,4-butanediol, which is e.g. commercially available from Mitsubishi Chemicals under the tradename BioPBS™ FZ71, can be used. Preferably, the aliphatic polyester is biodegradable. In particular, polybutylene succinate (PBS) is a biodegradable aliphatic polyester.

Preferably, the fiber comprises the aliphatic polyester in an amount of from 30 to 70% by weight, based on 100% by weight of the combined amount of the aliphatic polyester, the aliphatic-aromatic polyester, and the polyhydroxyalkanoate. More preferably, the fiber comprises the aliphatic polyester in an amount of from 35 to 65% by weight, based on 100% by weight of the combined amount of the aliphatic polyester, the aliphatic-aromatic polyester, and the polyhydroxyalkanoate. Still more preferably, the fiber comprises the aliphatic polyester in an amount of from 40 to 60% by weight or 42 to 62% by weight, based on 100% by weight of the combined amount of the aliphatic polyester, the aliphatic-aromatic polyester, and the polyhydroxyalkanoate. Even more preferably, the fiber comprises the aliphatic polyester in an amount of from 45 to 55% by weight, based on 100% by weight of the combined amount of the aliphatic polyester, the aliphatic-aromatic polyester, and the polyhydroxyalkanoate. In particular, these ranges can be applied when the aliphatic polyester is a polybutylene succinate. In a preferred embodiment, the fiber comprises 52% by weight of a polybutylene succinate based on 100% by weight of the combined amount of the polybutylene succinate, an aliphatic aromatic polyester and a polyhydroxyalkanoate.

The term "aliphatic-aromatic polyester" as used herein in general refers to a polyester which is typically synthesized from an aliphatic diol, an aliphatic dicarboxylic acid and an aromatic dicarboxylic acid. As an illustrative example, the aliphatic-aromatic polyester may comprise an aliphatic $C_2$-$C_{20}$ dicarboxylic acid, an aromatic dicarboxylic acid and an aliphatic $C_2$-$C_{12}$ diol. Preferably, the aliphatic diol is an aliphatic $C_2$-$C_8$ diol. More preferably, the aliphatic diol is an aliphatic $C_2$-$C_6$ diol. Even more preferably, the aliphatic diol is an aliphatic $C_3$ diol or an aliphatic $C_4$ diol. Aliphatic diols used in the aliphatic-aromatic polyester may include, as illustrative examples, ethylene glycol, propylene glycol, 1,3-propanediol, 1,3-butanediol, 1,4-butanediol, 1,5 pentanediol, and 1,6-hexanediol. Preferably, the aliphatic diol is 1,3-propanediol or 1,4-butanediol. More preferably, the aliphatic diol is 1,4-butanediol. Preferably, the aliphatic dicarboxylic acid is an aliphatic $C_2$-$C_{12}$ dicarboxylic acid. More preferably, the aliphatic dicarboxylic acid is an aliphatic $C_4$-$C_{10}$ dicarboxylic acid, even more preferably an aliphatic $C_6$ dicarboxylic acid. Aliphatic dicarboxylic acids used in the aliphatic-aromatic polyester may include, as illustrative examples, glutaric acid, adipic acid, pimelic acid, azelaic acid, sebacic acid, brassylic acid, suberic acid, and itaconic acid. Preferably, the aliphatic dicarboxylic acid is adipic acid, azelaic acid, or sebacic acid. More preferably, the aliphatic dicarboxylic acid is adipic acid. Preferably, the aromatic dicarboxylic acid is terephthalic acid. The aromatic dicarboxylic acid, in particular terephthalic acid, may be present in the aliphatic-aromatic polyester in an amount of e.g. from 30 to 70 mol-%, preferably of from 40 to 60 mol-%, more preferably of from 40 to 55 mol-%, each based on 100 mol-% of the combined amount of the aliphatic dicarboxylic acid and the aromatic dicarboxylic acid. Optionally, the aliphatic polyester may further comprise a chain extender and/or a branching agent. Optional chain extenders may include, as illustrative examples, a di- or polyfunctional isocyanate, preferably hexamethylenediisocyanate. Optional branching agents may include, as illustrative examples, trimethylolpropane, pentaerythritol, and preferably glycerol. The optional chain extender and/or branching agent may be present in the aliphatic polyester at a ratio of from 0 to 1% by weight based on 100% by weight of the combined amount of the aliphatic dicarboxylic acid, the aromatic dicarboxylic acid, and the aliphatic diol. The term "aliphatic-aromatic polyester" may also include a mixture of two or more different aliphatic-aromatic polyesters. The aliphatic-aromatic polyester may have a number average molecular weight (Mn) ranging from 1,000 to 500,000 g/mol, preferably from 5,000 to 300,000 g/mol, more preferably from 5,000 to 100,000 g/mol, still more preferably from 10,000 to 75,000 g/mol, even more preferably from 15,000 to 50,000 g/mol. The aliphatic-aromatic polyester may have a weight average molecular weight (Mw) ranging from 10,000 to 500,000 g/mol, preferably from 20,000 to 400,000 g/mol, more preferably from 30,000 to 300,000 g/mol, still more preferably from 60,000 to 200,000 g/mol. The aliphatic-aromatic polyester may have a polydispersity index (i.e. the ratio of the weight average molecular weight to the number average molecular weight (Mw/Mn)) ranging from 1 to 6, preferably from 2 to 4, more preferably from 1.0 to 3.0, still more preferably from 1.2 to 2.0, even more preferably from 1.4 to 1.8.

Aliphatic-aromatic polyesters, which can be used in the present invention, may include, but are not limited to, an aliphatic-aromatic polyester selected from the group consisting of a polybutylene adipate terephthalate (PBAT), a polybutylene succinate terephthalate (PBST), a polybutylene sebacate terephthalate (PBSeT), and any combination thereof. In one preferred embodiment, the aliphatic-aromatic polyester is a polybutylene adipate terephthalate (PBAT). The term "polybutylene adipate terephthalate" as used herein denotes an aliphatic-aromatic polyester which comprises the aliphatic dicarboxylic acid adipic acid, the aromatic dicarboxylic acid terephthalic acid, and the aliphatic diol 1,4-butanediol. The aliphatic-aromatic polyester, in particular polybutylene adipate terephthalate (PBAT), may be obtained from renewable resources or from fossil resources. Preferably, an aliphatic-aromatic polyester from renewable resources is used. Polybutylene adipate terephthalate (PBAT) is marketed, for example, by BASF as Ecoflex®, e.g. Ecoflex® F Blend C1200 or Ecoflex® FBX 7011, or by Showa Denko as Bionolle®. Preferably, the aliphatic-aromatic polyester is biodegradable. In particular, polybutylene adipate terephthalate (PBAT) is a biodegradable aliphatic-aromatic polyester.

Preferably, the fiber comprises the aliphatic-aromatic polyester in an amount of from 10 to 60% by weight, based on 100% by weight of the combined amount of the aliphatic polyester, the aliphatic-aromatic polyester, and the polyhydroxyalkanoate. More preferably, the fiber comprises the aliphatic-aromatic polyester in an amount of from 20 to 50% by weight, based on 100% by weight of the combined amount of the aliphatic polyester, the aliphatic-aromatic polyester, and the polyhydroxyalkanoate. Still more preferably, the fiber comprises the aliphatic-aromatic polyester in an amount of from 25 to 40% by weight or 26 to 46% by weight, based on 100% by weight of the combined amount of the aliphatic polyester, the aliphatic-aromatic polyester, and the polyhydroxyalkanoate. Even more preferably, the fiber comprises the aliphatic-aromatic polyester in an amount of from 30 to 40% by weight, based on 100% by weight of the combined amount of the aliphatic polyester, the aliphatic-aromatic polyester, and the polyhydroxyalkanoate. In particular, these ranges can be applied when the aliphatic-aromatic polyester is a polybutylene adipate terephthalate (PBAT). In a preferred embodiment, the fiber comprises 36% by weight polybutylene adipate terephthalate (PBAT) based on 100% by weight of the combined amount of an aliphatic polyester, the polybutylene adipate terephthalate (PBAT) and a polyhydroxyalkanoate.

The term "polyhydroxyalkanoate" as used herein in general refers to a polyester from hydroxyalkane carboxylic acid monomers. Polyhydroxyalkanoates can be produced by numerous microorganisms, including through bacterial fermentation of sugars or lipids. Preferably, the hydroxyalkane carboxylic acid is a $C_4$-$C_{18}$ hydroxyalkane carboxylic acid, i.e. preferably the hydroxyalkane carboxylic acid comprises 4 to 18 carbon atoms. More preferably, the polyhydroxyalkanoate comprises monomeric units having the following formula (I):

(I)

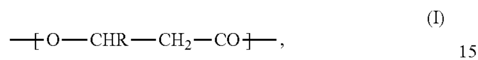

wherein R is an alkyl group having the formula $C_nH_{2n+1}$, and n is an integer of from 1 to 15, preferably of from 1 to 6. In some embodiments, the polyhydroxyalkanoate is a homopolymer. In some preferred embodiments, the polyhydroxyalkanoate is a copolymer. When the polyhydroxyalkanoate is a copolymer, the copolymer may comprise two different monomeric units of formula (I). The term "polyhydroxyalkanoate" may also include a mixture of two or more different polyhydroxyalkanoates. The polyhydroxyalkanoate may have a weight average molecular weight (Mw) ranging from 70,000 to 1,000,000 g/mol, preferably from 100,000 to 1,000,000 g/mol, more preferably from 300,000 to 600,000 g/mol.

Illustrative examples of polyhydroxyalkanoates, which can be used in the present disclosure, may include a polyhydroxyalkanoate selected from the group consisting of a polyhydroxybutyrate, a polyhydroxyvalerate, a polyhydroxybutyrate-co-hydroxyvalerate, a polyhydroxybutyrate-co-hydroxyhexanoate, and any combination thereof. Preferably, the polyhydroxyalkanoate is selected from the group consisting of a poly-3-hydroxybutyrate (P3HB), a poly-4-hydroxybutyrate (P4HB), a poly-3-hydroxyvalerate (PHV), a poly(3-hydroxybutyrate-co-4-hydroxybutyrate), a poly(3-hydroxybutyrate-co-3-hydroxyvalerate) (PHBV), a poly(3-hydroxybutyrate-co-3-hydroxyhexanoate) (PHBH), and any combination thereof. Still more preferably, the polyhydroxyalkanoate is selected from the group consisting of a poly-3-hydroxybutyrate (PHB)

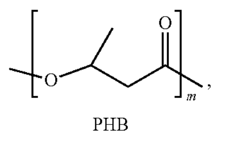

PHB a poly(3-hydroxybutyrate-co-3-hydroxyvalerate) (PHBV)

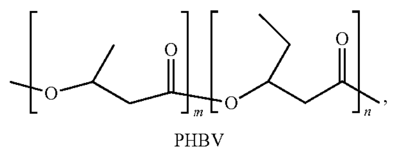

PHBV and a poly(3-hydroxybutyrate-co-3-hydroxyhexanoate) (PHBH)

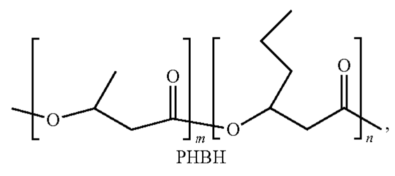

PHBH and any combination thereof. Even more preferably, the polyhydroxyalkanoate is a polyhydroxybutyrate-co-hydroxyhexanoate. In a very preferred embodiment, the polyalkoxyalkanoate is a poly(3-hydroxybutyrate-co-3-hydroxyhexanoate) (PHBH). Preferably, the molar ratio min in the foregoing structural formulae is of from 95:5 to 85:15, more preferably of from 90:10 to 88:12. Preferably, a poly(3-hydroxybutyrate-co-3-hydroxyhexanoate) (PHBH) having a molar ratio of 3-hydroxyhexanoate of from 5 to 15 mol-%, preferably of from 7 to 13 mol-%, more preferably of from 10 to 13 mol-%, each based on 100 mol-% of the total amount of monomers in the poly(3-hydroxybutyrate-co-3-hydroxyhexanoate) (PHBH), is used. Poly(3-hydroxybutyrate-co-3-hydroxyhexanoate) (PHBH) is marketed by way of example by P&G or Kancka. The polyhydroxyalkanoate, in particular poly(3-hydroxybutyrate-co-3-hydroxyhexanoate) (PHBH), may be obtained from renewable resources or fossil resources. Preferably, a polyhydroxyalkanoate from renewable resources is used. More preferably, bio-based poly(3-hydroxybutyrate-co-3-hydroxyhexanoate) (PHBH), which is e.g. commercially available from Kaneka under the tradename AONILEX X 151 A, can be used. Preferably, the polyhydroxyalkanoate is biodegradable. In particular, poly(3-hydroxybutyrate-co-3-hydroxyhexanoate) (PHBH) is a biodegradable polyhydroxyalkanoate.

Preferably, the fiber comprises the polyhydroxyalkanoate in an amount of from 1 to 25% by weight, based on 100% by weight of the combined amount of the aliphatic polyester, the aliphatic-aromatic polyester, and the polyhydroxyalkanoate. More preferably, the fiber comprises the polyhydroxyalkanoate in an amount of from 2 to 22% by weight, based on 100% by weight of the combined amount of the aliphatic polyester, the aliphatic-aromatic polyester, and the polyhydroxyalkanoate. Still more preferably, the fiber comprises the polyhydroxyalkanoate in an amount of 3 to 20 by weight, based on 100% by weight of the combined amount of the aliphatic polyester, the aliphatic-aromatic polyester, and the polyhydroxyalkanoate. Still more preferably, the fiber comprises the polyhydroxyalkanoate in an amount of from 3 to 18% by weight, based on 100% by weight of the combined amount of the aliphatic polyester, the aliphatic-aromatic polyester, and the polyhydroxyalkanoate. Even more preferably, the fiber comprises the polyhydroxyalkanoate in an amount of from 5 to 15% by weight, based on 100% by weight of the combined amount of the aliphatic polyester, the aliphatic-aromatic polyester, and the polyhydroxyalkanoate. In particular, these ranges can be applied when the polyhydroxyalkanoate is a polyhydroxybutyrate-co-hydroxyhexanoate, preferably a poly(3-hydroxybutyrate-co-3-hydroxyhexanoate) (PHBH). Preferably, when the polyhydroxyalkanoate is a polyhydroxybutyrate-cohydroxyhexanoate, preferably a poly(3-hydroxybutyrate-co-3-hydroxyhexanoate) (PHBH), the fiber comprises 20% by weight or less, more preferably 18% by weight or less of the polyhydroxybutyrate-co-hydroxyhexanoate, preferably the poly(3-hydroxybutyrate-co-3-hydroxyhexanoate) (PHBH) based on 100% by weight of the combined amount of an aliphatic polyester, an aliphatic-aromatic polyester and the polyhydroxybutyrate-co-hydroxyhexanoate, preferably the poly(3-hydroxybutyrate-co-3-hydroxyhexanoate) (PHBH). If the ratio of the polyhydroxybutyrate-co-hydroxyhexanoate, preferably the poly(3-hydroxybutyrate-co-3-hydroxyhexanoate) (PHBH) exceeds 18% by weight, achieving the EN 13432 standard for biodegradability without pre-composting or industrial composting may become difficult, when exceeding 20% by weight still more difficult. In a preferred embodiment, the fiber comprises 12% by weight poly(3-hydroxybutyrate-co-3-hydroxyhexanoate) (PHBH) based on 100% by weight of the combined amount of a polybutylene succinate, a polybutylene adipate terephthalate and a poly (3-hydroxybutyrate-co-3-hydroxyhexanoate) (PHBH).

In one very preferred embodiment, the aliphatic polyester is a polybutylene succinate (PBS), the aliphatic-aromatic polyester is a polybutylene adipate terephthalate (PBAT), and the polyalkoxyalkanoate is a poly(3-hydroxybutyrate-co-3-hydroxyhexanoate) (PHBH). Accordingly, in one very preferred embodiment, the fiber comprises a polybutylene succinate (PBS), a polybutylene adipate terephthalate (PBAT), and a poly(3-hydroxybutyrate-co-3-hydroxyhexanoate) (PHBH).

The ranges for the amounts of the aliphatic polyester, the aliphatic-aromatic polyester and the polyhydroxyalkanoate may be also combined with each other. Accordingly, as illustrative examples, the fiber may comprise the aliphatic polyester in an amount of from 42 to 62% by weight, preferably 45 to 55% by weight, the fiber may comprise the aliphatic-aromatic polyester in an amount of from 26 to 46% by weight, preferably 30 to 40% by weight, and the fiber may comprise the polyhydroxyalkanoate in an amount of from 2 to 22% by weight, preferably 3 to 20% by weight, more preferably 3 to 18% by weight, each based on 100% by weight of the combined amount of the aliphatic polyester, the aliphatic-aromatic polyester and the polyhydroxyalkanoate. A person skilled in the art will readily select suitable amounts of one or more of the polymer(s) within the ranges provided herein, so that the total amount of 100% by weight of the combined amount of the aliphatic polyester, the aliphatic-aromatic polyester and the polyhydroxyalkanoate is not exceeded. In particular, these ranges can be applied when the aliphatic polyester is a polybutylene succinate, the aliphatic aromatic polyester is a polybutylene adipate terephthalate, and the polyhydroxyalkanoate is a polyhydroxybutyrate-co-hydroxyhexanoate, preferably a poly(3-hydroxybutyrate-co-3-hydroxyhexanoate) (PHBH). In a very preferred embodiment, the fiber comprises 52% by weight of a polybutylene succinate, 36% by weight of a polybutylene adipate terephthalate and 12% by weight of a polyhydroxybutyrate-co-hydroxyhexanoate, preferably a poly(3-hydroxybutyrate-co-3-hydroxyhexanoate) (PHBH), each based on 100% by weight of the combined amount of the polybutylene succinate, the polybutylene adipate terephthalate and the polyhydroxybutyrate-co-hydroxyhexanoate, preferably the poly(3-hydroxybutyrate-co-3-hydroxyhexanoate) (PHBH).

Preferably, the fiber is a textile fiber. The term "textile fiber", as used herein, in general refers to a fiber which is suitable for producing a textile. As illustrative non-limiting examples, a textile fiber may be suitable for preparing a yarn, a textile or a textile surface.

Optionally, the fiber may further comprise at least one additive (one or more additives). For example, the fiber may comprise at least one additive (or one or more additives) that is generally known to be used in a textile fiber. The optional additives may include, but are not limited to, additives such as a flame retardant, a matting agent, a marker for authentication (e.g., a fluorescence marker), an antimicrobial agent, a filler, and any combination thereof.

Preferably, the fiber further comprises a flame retardant, for example, a flame retardant such as a phosphate. The term "phosphate" as used herein refers to a salt comprising an anion selected from the group consisting of $[H_2PO_4]^-$, $[HPO_4]^{2-}$ and $[PO_4]^{3-}$. Preferably, the cation is ammonium $[NH_4]^+$. Accordingly, in preferred embodiments, the flame retardant is selected from the group consisting of ammonium dihydrogenphosphate ($[NH_4][H_2PO_4]$), di-ammonium hydrogenphosphate ($[NH_4]_2[HPO_4]$), triammonium phosphate ($[NH_4]_3[PO_4]$) and any combination thereof. More preferably, the flame retardant is selected from the group consisting of ammonium dihydrogenphosphate ($[NH_4][H_2PO_4]$), di-ammonium hydrogenphosphate ($[NH_4]_2[HPO_4]$) and any combination thereof. More preferably, the flame retardant is ammonium dihydrogenphosphate ($[NH_4][H_2PO_4]$) or di-ammonium hydrogenphosphate ($[NH_4]_2[HPO_4]$). Still more preferably, the flame retardant is di-ammonium hydrogenphosphate ($[NH_4]_2[HPO_4]$). Alternatively, or in addition, the flame retardant may be a polyphosphate. "Polyphosphates" are salts or esters of polymeric oxyanions formed from tetrahedral $PO_4$ (phosphate) structural units linked together by sharing oxygen atoms. Preferably, when the flame retardant is a polyphosphate, the flame retardant is ammonium polyphosphate. Without wishing to be bound by theory, it is believed herein that adding a phosphate or polyphosphate flame retardant, in particular di-ammonium hydrogenphosphate ($[NH_4]_2[HPO_4]$), may promote the partial fusion of adjacent hollow fiber portions during the cooling of the precursor fiber under a temperature gradient, which may contribute to obtaining the structure of the fiber comprising thicker portions with cavities and thinner portions having a compact structure, as described herein.

The fiber may comprise the flame retardant in an amount of from 0.01 to 5% by weight, based on 100% by weight on the total weight of the fiber. Preferably, the fiber comprises the flame retardant in an amount of from 0.1 to 4% by weight, based on 100% by weight of the total weight of the fiber. More preferably, the fiber comprises the flame retardant in an amount of from 0.2% to 3% by weight, based on 100% by weight of the total weight of the fiber. Still more preferably, the fiber comprises the flame retardant in an amount of from 0.3 to 3% by weight, based on 100% by weight of the total weight of the fiber. Even more preferably, the fiber comprises the flame retardant in an amount of from 0.3 to 2% by weight, based on 100% by weight of the total weight of the fiber. In particular, the foregoing ranges can be applied when the flame retardant is a phosphate or a polyphosphate, preferably, when the flame retardant is di-ammonium hydrogenphosphate ($[NH_4]_2[HPO_4]$).

Optionally, the fiber may (also) comprise a matting agent. Any matting agent known to a person skilled in the art can be used, such as a typical matting agent used in fibers. As illustrative example, the matting agent may be zinc sulfide.

Optionally, the fiber may (also) comprise a marker suitable for authentication. As an illustrative non-limiting example, the marker suitable for authentication can be a fluorescence marker. Fluorescence of the fiber can then be detected by a suitable device and taken for authentication of the fiber. For example, a fluorescence marker available from Polysecure, Freiburg im Breisgau, Germany can be used. The marker suitable for authentication is generally used only in small amounts, which usually do not alter the properties of the fiber. Typically, the amount of the marker suitable for authentication in the fiber is in the ppb (parts per billion) range.

Optionally, the fiber may (also) include an antimicrobial agent. Any antimicrobial agent known to a person skilled in the art, which is suitable for being used in a fiber, can be used. As an illustrative non-limiting example, the antimicrobial agent may be zinc encapsulated with polyethylene terephthalate. Such matting agent, e.g., is commercially available from Smartpolymer GmbH, Rudolstadt, Germany, under the trade name SMARTZINC 213 PET Hot Melt.

Optionally, the fiber may (also) include a filler. Any filler known to a person skilled in the art, which is suitable for being used in a fiber, may be used with biodegradable fillers being preferred. As illustrative example, the (biodegrable) filler may be lignin or may comprise lignin.

A person skilled in the art will readily select suitable amount(s) of the additive(s) to be comprised in the fiber. As an illustrative example, the fiber may comprise a total amount of additive(s) of 15% by weight or less, based on 100% by weight of the total weight of the fiber. The fiber may comprise a total amount of additive(s) of 10% by weight or less, based on 100% by weight of the total weight of the fiber. Preferably, the fiber comprises a total amount of additives of 7% by weight or less, based on 100% by weight of the total weight of the fiber. More preferably, the fiber comprises a total amount of additives of 5% by weight or less, based on 100% by weight of the total weight of the fiber. Still more preferably, the fiber comprises a total amount of additives of 4% by weight or less, based on 100% by weight of the total weight of the fiber. Even more preferably, the fiber comprises a total amount of additives of 3 to 4% by weight, based on 100% by weight of the total weight of the fiber. It is preferred that the fiber comprises a total amount of additives of 7% by weight or less, more preferably 3 to 4% by weight, each based on 100% by weight of the total weight of the fiber, in order to achieve a stiffness of the fiber which is useful for a textile fiber.

The fiber titer is not particularly limited. For example, any fiber titer which is commonly used in the textile industry can be applied. As an illustrative example, the fiber titer may be 0.5 to 8 den. Preferably, the fiber titer is 0.8 to 6 den. More preferably, the fiber titer 0.9 to 3 den. Still more preferably, the fiber titer is 1.0 to 2 den. Still more preferably, the fiber titer is 1.0 to 1.5 den. Even more preferably, the fiber titer is 1.1 to 1.2 den.

The fiber may be a staple fiber. The term "staple fiber" as used herein in general refers to fibers of discrete length. The staple length is not particularly limited. For example, any stable length which is commonly used in the textile industry can be applied. Accordingly, as an illustrative example, the fiber may have a staple length of from 2 to 80 mm. Preferably, the fiber has staple length of from 5 to 70 mm. More preferably, the fiber has a staple length of from 10 to 60 mm. Still more preferably, the fiber has a staple length of from 15 to 50 mm. Even more preferably, the fiber has a staple length of from 20 to 40 mm. Even more preferably, the fiber has a staple length of from 22 to 35 mm. Even more preferably, the fiber has a staple length of from 25 to 32 mm. The term "staple length" in general refers to an average length of the fibers in a sample.

The fiber may be a filament. The term "filament" or "filament fiber" in general refers to a fiber of practically unlimited length. Accordingly, the term "filament" or "filament fiber" in general refers to a continuous fiber.

Preferably, the fiber is biodegradable. More preferably, the fiber is biodegradable in accordance with EN 13432. Accordingly, the fiber may be considered as biodegradable in accordance with EN 13432 when the fiber has a DIN EN 13432 percentage degree of biodegradation equal to at least 90% after the prescribed periods of time. The general effect of biodegradability is that the fiber decomposes within an appropriate and verifiable interval. Degradation may be effected enzymatically, hydrolytically, oxidatively and/or through action of electromagnetic radiation, for example UV radiation, and may be predominantly due to the action of microorganisms such as bacteria, yeasts, fungi and algae. Biodegradability can be quantified, for example, by the fiber being mixed with compost and stored for a certain time. For example, $CO_2$-free air can be flowed through ripened compost during composting and the ripened compost subjected to a defined temperature program. Biodegradability can be, for example, defined via the ratio of the net $CO_2$ released by the sample (after deduction of the $CO_2$ released by the compost without sample) to the maximum amount of $CO_2$ releasable by the sample (reckoned from the carbon content of the sample), as a percentage degree of biodegradation. A biodegradable fiber typically shows clear signs of degradation, such as fungal growth, cracking and holing, after just a few days of composting. Other methods of determining biodegradability are described, for example, in ASTM D 5338 and ASTM D 6400.

Preferably, the thicker portions and the thinner portions of the fiber are arranged in an alternating pattern along the longitudinal direction of the fiber. The length of the thicker portions and the thinner portions along the longitudinal direction of the fiber may be irregular.

In a fiber, an extension of a cavity in a longitudinal direction of the fiber may be greater than an extension of said cavity in a vertical direction relative to the longitudinal direction of the fiber. The cavity may have an irregular circumference (as shown, e.g., in FIG. 5E). In particular, the circumference may be irregular in a plane that is conceived in a vertical direction relative to the longitudinal direction of the fiber.

Preferably, the fiber is a crimped fiber.

The present invention also relates to a hollow fiber being made from a mixture comprising an aliphatic polyester, and aliphatic-aromatic polyester, and a polyhydroxyalkanoate. The term "hollow fiber", as used herein and known in the art, in general refers to a fiber which has one or more, in particular one, continuous cavities in cross section (see, e.g., FIG. 8 for an illustrative example of a hollow fiber 21 having a continuous cavity 23). The one or more cavities may be filled, for example, with air. Such hollow fiber can be prepared by any method known in the art which is suitable for preparing a hollow fiber.

As an illustrative example, the hollow fiber may be obtainable or can be obtained by a method comprising spinning a melt comprising an aliphatic polyester, an aliphatic-aromatic polyester and a polyhydroxyalkanoate through a hollow fiber spinning nozzle to a obtain a precursor fiber. As an illustrative example, as already described herein above, the aliphatic polyester, aliphatic-aromatic polyester and polyhydroxyalkanoate can be mixed in the unmolten state, e.g. mixing granules of the polymers, optionally with addition of one or more further additives, and the mixture can be heated to or above the melting point(s) of the polymers. As an illustrative example, the mixing and heating may be carried out in an extruder. The melt is then passed through a hollow fiber spinning nozzle. As an illustrative example, an extruder may be used for passing the melt through the hollow fiber spinning nozzle. Any hollow fiber spinning nozzle generally known in the art may be used, such as e.g. a hollow fiber spinning nozzle as described in EP 2 112 256, the whole content of which is hereby incorporated by reference. By spinning a melt comprising an aliphatic polyester, an aliphatic aromatic polyester, and a polyhydroxyalkanoate through a hollow fiber spinning nozzle, a hot precursor fiber is obtained. However, after passing through the spinning nozzle, in order to obtain a conventional hollow fiber the precursor fiber is cooled using conventional means. Cooling using conventional means may, for example, envisage that cooling of the precursor fiber is effected under a substantially homogeneous temperature distribution through the fiber. Accordingly, a temperature gradient as described herein above may be substantially avoided. A substantially homogeneous temperature distribution may be generated by one or more temperature control elements. As illustrative examples, a homogeneous temperature distribution can be generated by arranging and/or operating temperature control elements within the spinning apparatus or the vicinity of the spinning apparatus in a suitable manner. The temperature control elements can be heating and/or cooling elements (e.g., air cooling aggregates) which can either actively or passively provide a heating or cooling effect to the precursor fiber. By means of such temperature control elements, it is possible to cool each side/surface area of the precursor fiber such that the temperature distribution on each side/surface area is substantially homogenous. A person skilled in the art will readily arrange the one or more temperature control elements in a suitable manner for achieving a homogeneous temperature distribution through the precursor fiber. For example, the precursor fiber may be cooled using air cooling. Preferably, air cooling may be effected by providing air flows onto the precursor fiber from both sides, in a substantially vertical direction relative to a longitudinal direction of the precursor fiber, by using air cooling aggregates arranged on both sides of the precursor fiber. Providing air flows onto the precursor fiber from both sides can be achieved, as merely illustrative example, by removing the baffle 5 shown in FIG. 1 between the precursor fiber 3 and the air flow 9.

The hollow fiber may be further defined as described herein for any fiber. Accordingly, as illustrative examples, the hollow fiber may be further defined as described herein for any fiber with regard to the aliphatic polyester, the aliphatic-aromatic polyester and the polyhydroxyalkanoate, the ratios of the polymers, and/or the at least one additive.

Optionally, any fiber described herein may be subjected to a fiber after treatment, e.g. using a fiber aftertreatment line. After treatment may comprise steps conventionally used for treatment of a fiber, such as e.g. reed, intake structure, dipping, drafting, stretching, steaming, reviving, crimping, drying, and/or staple cutting.

The present invention also relates to a yarn comprising a fiber as described herein. Any type of yarn may be considered. As non-illustrative examples, the yarn may be a spun yarn, a carded or combed yarn, a hosiery yarn, an open-end yarn, a novelty yarn, a filament yarn, or a texturized yarn. A yarn may be prepared from the fiber described herein by any method suitable for preparing a yarn. Methods for preparing a yarn are generally known and readily selected by a person skilled in the art.

The present invention also relates to a textile surface comprising a fiber as described herein. The present invention also relates to a textile surface comprising a yarn, said yarn comprising a fiber as described herein. As illustrative, non-limiting examples, the textile surface may be selected from the group consisting of a fabric, a knitted fabric, and non-wovens. The fiber or yarn comprising the fiber can be also used for preparing a fleece.

The present invention also relates to a textile comprising a fiber as described herein. The present invention also relates to a textile comprising a yarn, said yarn comprising a fiber as described herein. The textile may be a clothing. As illustrative, non-limiting examples, the clothing may be selected from the group consisting of a shirt, a polo shirt, a pair of trousers, a jacket, underwear, socks, a coat, a shoe and shoe laces. In particular, the clothing may be a shirt or a polo shirt, preferably a shirt. The textile may be a home textile. As illustrative, non-limiting examples, the home textile may be selected from the group consisting of a curtain, a rug, a blanket, a bedsheet, a duvet, a duvet cover, a cushion, a cushion cover and a towel.

The present invention also relates to a method of preparing a fiber according to the invention, comprising:

spinning a melt comprising an aliphatic polyester, an aliphatic-aromatic polyester, and a polyhydroxyalkanoate through a hollow fiber spinning nozzle to obtain a precursor fiber; and cooling the precursor fiber under a temperature gradient, thereby obtaining the fiber. The fiber may be further defined as described herein.

Preferably, the temperature gradient is generated by cooling the precursor fiber from one side.

Preferably, the cooling is effected by air cooling.

Preferably, the melt comprises the aliphatic polyester in an amount of from 30 to 70% by weight, based on 100% by weight of the combined amount of the aliphatic polyester, the aliphatic-aromatic polyester, and the polyhydroxyalkanoate. More preferably, the melt comprises the aliphatic polyester in an amount of from 35 to 65% by weight, based on 100% by weight of the combined amount of the aliphatic polyester, the aliphatic-aromatic polyester, and the polyhydroxyalkanoate. Still more preferably, the melt comprises the aliphatic polyester in an amount of from 40 to 60% by weight or 42 to 62% by weight, based on 100% by weight of the combined amount of the aliphatic polyester, the aliphatic-aromatic polyester, and the polyhydroxyalkanoate. Even more preferably, the melt comprises the aliphatic polyester in an amount of from 45 to 55% by weight, based on 100% by weight of the combined amount of the aliphatic polyester, the aliphatic-aromatic polyester, and the polyhydroxyalkanoate. In particular, these ranges can be applied when the aliphatic polyester is a polybutylene succinate. In a preferred embodiment, the melt comprises 52% by weight of a polybutylene succinate based on 100% by weight of the combined amount of the polybutylene succinate, an aliphatic aromatic polyester and a polyhydroxyalkanoate.

Preferably, the melt comprises the aliphatic-aromatic polyester in an amount of from 10 to 60% by weight, based on 100% by weight of the combined amount of the aliphatic polyester, the aliphatic-aromatic polyester, and the polyhydroxyalkanoate. More preferably, the melt comprises the aliphatic-aromatic polyester in an amount of from 20 to 50% by weight, based on 100% by weight of the combined amount of the aliphatic polyester, the aliphatic-aromatic polyester, and the polyhydroxyalkanoate. Still more preferably, the melt comprises the aliphatic-aromatic polyester in an amount of from 25 to 40% by weight or 26 to 46% by weight, based on 100% by weight of the combined amount of the aliphatic polyester, the aliphatic-aromatic polyester, and the polyhydroxyalkanoate. Even more preferably, the melt comprises the aliphatic-aromatic polyester in an amount of from 30 to 40% by weight, based on 100% by weight of the combined amount of the aliphatic polyester, the aliphatic-aromatic polyester, and the polyhydroxyalkanoate. In particular, these ranges can be applied when the aliphatic-aromatic polyester is a polybutylene adipate terephthalate (PBAT). In a preferred embodiment, the melt comprises 36% by weight polybutylene adipate terephthalate (PBAT) based on 100% by weight of the combined amount of an aliphatic polyester, the polybutylene adipate terephthalate (PBAT) and a polyhydroxyalkanoate.

Preferably, the melt comprises the polyhydroxyalkanoate in an amount of from 1 to 25% by weight, based on 100% by weight of the combined amount of the aliphatic polyester, the aliphatic-aromatic polyester, and the polyhydroxyalkanoate. More preferably, the melt comprises the polyhydroxyalkanoate in an amount of from 2 to 22% by weight, based on 100% by weight of the combined amount of the aliphatic polyester, the aliphatic-aromatic polyester, and the polyhydroxyalkanoate. Still more preferably, the melt comprises the polyhydroxyalkanoate in an amount of 3 to 20 by weight, based on 100% by weight of the combined amount of the aliphatic polyester, the aliphatic-aromatic polyester, and the polyhydroxyalkanoate. Still more preferably, the melt comprises the polyhydroxyalkanoate in an amount of from 3 to 18% by weight, based on 100% by weight of the combined amount of the aliphatic polyester, the aliphatic-aromatic polyester, and the polyhydroxyalkanoate. Even more preferably, the melt comprises the polyhydroxyalkanoate in an amount of from 5 to 15% by weight, based on 100% by weight of the combined amount of the aliphatic polyester, the aliphatic-aromatic polyester, and the polyhydroxyalkanoate. In particular, these ranges can be applied when the polyhydroxyalkanoate is a polyhydroxybutyrate-co-hydroxyhexanoate, preferably a poly(3-hydroxybutyrate-co-3-hydroxyhexanoate) (PHBH). Preferably, when the polyhydroxyalkanoate is a polyhydroxybutyrate-co-hydroxyhexanoate, preferably a poly(3-hydroxybutyrate-co-3-hydroxyhexanoate) (PHBH), the melt comprises 20% by weight or less, more preferably 18% by weight or less of the polyhydroxybutyrate-co-hydroxyhexanoate, preferably a poly(3-hydroxybutyrate-co-3-hydroxyhexanoate) (PHBH) based on 100% by weight of the combined amount of an aliphatic polyester, an aliphatic-aromatic polyester and the polyhydroxybutyrate-co-hydroxyhexanoate, preferably the poly(3-hydroxybutyrate-co-3-hydroxyhexanoate) (PHBH).

The ranges for the amounts of the aliphatic polyester, the aliphatic-aromatic polyester and the polyhydroxyalkanoate may be also combined with each other. Accordingly, as illustrative examples, the melt may comprise the aliphatic polyester in an amount of from 42 to 62% by weight, preferably 45 to 55% by weight, the melt may comprise the aliphatic-aromatic polyester in an amount of from 26 to 46% by weight, preferably 30 to 40% by weight, and the melt may comprise the polyhydroxybutyrate in an amount of from 2 to 22% by weight, preferably 3 to 20% by weight, more preferably 3 to 18% by weight, each based on 100% by weight of the combined amount of the aliphatic polyester, the aliphatic-aromatic polyester and the polyhydroxyalkanoate. A person skilled in the art will readily select suitable amounts of one or more of the polymer(s) within the ranges provided herein, so that the total amount of 100% by weight of the combined amount of the aliphatic polyester, the aliphatic-aromatic polyester and the polyhydroxyalkanoate is not exceeded. In particular, these ranges can be applied when the aliphatic polyester is a polybutylene succinate, the aliphatic aromatic polyester is a polybutylene adipate terephthalate, and the polyhydroxyalkanoate is a polyhydroxybutyrate-co-hydroxyhexanoate, preferably a poly(3-hydroxybutyrate-co-3-hydroxyhexanoate) (PHBH). In a very preferred embodiment, the melt comprises 52% by weight of a polybutylene succinate, 36% by weight of a polybutylene adipate terephthalate and 12% by weight of a polyhydroxybutyrate-co-hydroxyhexanoate, preferably a poly(3-hydroxybutyrate-co-3-hydroxyhexanoate) (PHBH), each based on 100% by weight of the combined amount of the polybutylene succinate, the polybutylene adipate terephthalate and the polyhydroxybutyrate-co-hydroxyhexanoate, preferably the poly(3-hydroxybutyrate-co-3-hydroxyhexanoate) (PHBH).

Optionally, the melt may further comprise at least one additive. For example, the melt may comprise at least one additive as generally known to be used in a textile fiber. The optional additives may include, but are not limited to, an additive selected from the group consisting of a flame retardant, a matting agent, a marker for authentication (e.g., a fluorescence marker), an antimicrobial agent, a filler, and any combination thereof.

Preferably, the melt further comprises a flame retardant. More preferably, the flame retardant is a phosphate. In preferred embodiments, the flame retardant is selected from the group consisting of ammonium dihydrogenphosphate ($[NH_4][H_2PO_4]$), di-ammonium hydrogenphosphate ($[NH_4]_2$ $[HPO_4]$), triammonium phosphate ($[NH_4]_3[PO_4]$) and any combination thereof. More preferably, the flame retardant is selected from the group consisting of ammonium dihydrogenphosphate ($[NH_4][H_2PO_4]$), di-ammonium hydrogenphosphate ($[NH_4]_2[HPO_4]$) and any combination thereof. More preferably, the flame retardant is ammonium dihydrogenphosphate ($[NH_4][H_2PO_4]$) or di-ammonium hydrogenphosphate ($[NH_4]_2[HPO_4]$). Still more preferably, the flame retardant is di-ammonium hydrogenphosphate ($[NH_4]_2[HPO_4]$). Alternatively, or in addition, the flame retardant may be a polyphosphate. Preferably, when the flame retardant is a polyphosphate, the flame retardant is ammonium polyphosphate.

The melt may comprise the flame retardant in an amount of from 0.01 to 5% by weight, based on 100% by weight of the total weight of the melt. Preferably, the melt comprises the flame retardant in an amount of from 0.1 to 4% by weight, based on 100% by weight of the total weight of the melt. More preferably, the melt comprises the flame retardant in an amount of from 0.2% to 3% by weight, based on 100% by weight of the total weight of the melt. Still more preferably, the melt comprises the flame retardant in an amount of from 0.3 to 3% by weight, based on 100% by weight of the total weight of the melt. Even more preferably, the melt comprises the flame retardant in an amount of from 0.3 to 2% by weight, based on 100% by weight of the total weight of the melt. In particular, the foregoing ranges can be applied when the flame retardant is a phosphate or a polyphosphate, preferably, when the flame retardant is di-ammonium hydrogenphosphate ($[NH_4]_2[HPO_4]$).

A person skilled in the art will readily select suitable amount(s) of the additive(s) to be comprised in the melt. As an illustrative example, the melt may comprise a total amount of additive(s) of 15% by weight or less, based on 100% by weight of the total weight of the melt. The melt may comprise a total amount of additive(s) of 10% by weight or less, based on 100% by weight of the total weight of the melt. Preferably, the melt comprises a total amount of additives of 7% by weight or less, based on 100% by weight of the total weight of the melt. More preferably, the melt comprises a total amount of additives of 5% by weight or less, based on 100% by weight of the total weight of the melt. Still more preferably, the melt comprises a total amount of additives of 4% by weight or less, based on 100% by weight of the total weight of the melt. Even more preferably, the melt comprises a total amount of additives of 3 to 4% by weight, based on 100% by weight of the total weight of the melt. It is preferred that the melt comprises a total amount of additives of 7% by weight or less, more preferably 3 to 4% by weight, each based on 100% by weight of the total weight of the melt, in order to achieve a stiffness of the fiber which is useful for a textile fiber.

The fiber may be prepared as a staple fiber.

The fiber may be prepared as a filament.

The present invention also relates to a use of a melt comprising an aliphatic polyester, an aliphatic-aromatic polyester, and a polyhydroxyalkanoate for the preparation of a fiber, wherein the fiber is as defined herein.

The present invention also relates to a use of a melt comprising an aliphatic polyester, an aliphatic-aromatic polyester, and a polyhydroxyalkanoate for the preparation of a hollow fiber.

The present invention also relates to a mixture comprising an aliphatic polyester, an aliphatic-aromatic polyester, and a polyhydroxyalkanoate. Such mixture can be used, e.g., for the preparation of a fiber according to the invention.

The aliphatic polyester, the aliphatic-aromatic polyester and the polyhydroxyalkanoate comprised in the mixture may be further defined as described herein, in particular as described herein for any fiber. In one very preferred embodiment, the aliphatic polyester is a polybutylene succinate (PBS), the aliphatic-aromatic polyester is a polybutylene adipate terephthalate (PBAT), and the polyalkoxyalkanoate is a poly(3-hydroxybutyrate-co-3-hydroxyhexanoate) (PHBH). Accordingly, the present invention also relates to a mixture comprising a polybutylene succinate (PBS), a polybutylene adipate terephthalate (PBAT), and a poly(3-hydroxybutyrate-co-3-hydroxyhexanoate) (PHBH).

In some embodiments, the mixture consists essentially of an aliphatic polyester, an aliphatic-aromatic polyester, and a polyhydroxyalkanoate. In some embodiments, the mixture consists essentially of a polybutylene succinate (PBS), a polybutylene adipate terephthalate (PBAT), and a poly(3-hydroxybutyrate-co-3-hydroxyhexanoate) (PHBH). In some embodiments, the mixture consists of an aliphatic polyester, an aliphatic-aromatic polyester, and a polyhydroxyalkanoate. In some embodiments, the mixture consists of a polybutylene succinate (PBS), a polybutylene adipate terephthalate (PBAT), and a poly(3-hydroxybutyrate-co-3-hydroxyhexanoate) (PHBH).

In the mixture, the aliphatic polyester, the aliphatic-aromatic polyester, and the polyhydroxyalkanoate may be present in the form of particles. Illustrative examples of particles, which can be used in the mixture, may be selected from the group consisting of granules, pellets, extrudates, beads, prills, and any combination thereof. Preferably, the aliphatic polyester, the aliphatic-aromatic polyester, and the polyhydroxyalkanoate is in the form of granules. In a very preferred embodiment, the mixture comprises a polybutylene succinate (PBS), a polybutylene adipate terephthalate (PBAT), and a poly(3-hydroxybutyrate-co-3-hydroxyhexanoate) (PHBH) in the form of granules. The present invention also relates to a granulate comprising a polybutylene succinate (PBS), a polybutylene adipate terephthalate (PBAT), and a poly(3-hydroxybutyrate-co-3-hydroxyhexanoate) (PHBH). In order to prepare a fiber, the mixture comprising particles of the polymers can be heated above the melting point(s) of the polymers. In some embodiments, the mixture can thus be present in form of a melt. The melt can be subjected to spinning, as described herein.

Preferably, the mixture comprises the aliphatic polyester in an amount of from 30 to 70% by weight, based on 100% by weight of the combined amount of the aliphatic polyester, the aliphatic-aromatic polyester, and the polyhydroxyalkanoate. More preferably, the mixture comprises the aliphatic polyester in an amount of from 35 to 65% by weight, based on 100% by weight of the combined amount of the aliphatic polyester, the aliphatic-aromatic polyester, and the polyhydroxyalkanoate. Still more preferably, the mixture comprises the aliphatic polyester in an amount of from 40 to 60% by weight or 42 to 62% by weight, based on 100% by weight of the combined amount of the aliphatic polyester, the aliphatic-aromatic polyester, and the polyhydroxyalkanoate. Even more preferably, the mixture comprises the aliphatic polyester in an amount of from 45 to 55% by weight, based on 100% by weight of the combined amount of the aliphatic polyester, the aliphatic-aromatic polyester, and the polyhydroxyalkanoate. In particular, these ranges can be applied when the aliphatic polyester is a polybutylene succinate. In a preferred embodiment, the mixture comprises 52% by weight of a polybutylene succinate based on 100% by weight of the combined amount of the polybutylene succinate, an aliphatic aromatic polyester and a polyhydroxyalkanoate.

Preferably, the mixture comprises the aliphatic-aromatic polyester in an amount of from 10 to 60% by weight, based on 100% by weight of the combined amount of the aliphatic polyester, the aliphatic-aromatic polyester, and the polyhydroxyalkanoate. More preferably, the mixture comprises the aliphatic-aromatic polyester in an amount of from 20 to 50% by weight, based on 100% by weight of the combined amount of the aliphatic polyester, the aliphatic-aromatic polyester, and the polyhydroxyalkanoate. Still more preferably, the mixture comprises the aliphatic-aromatic polyester in an amount of from 25 to 40% by weight or 26 to 46% by weight, based on 100% by weight of the combined amount of the aliphatic polyester, the aliphatic-aromatic polyester, and the polyhydroxyalkanoate. Even more preferably, the mixture comprises the aliphatic-aromatic polyester in an amount of from 30 to 40% by weight, based on 100% by weight of the combined amount of the aliphatic polyester, the aliphatic-aromatic polyester, and the polyhydroxyalkanoate. In particular, these ranges can be applied when the aliphatic-aromatic polyester is a polybutylene adipate terephthalate (PBAT). In a preferred embodiment, the mixture comprises 36% by weight polybutylene adipate terephthalate (PBAT) based on 100% by weight of the combined amount of an aliphatic polyester, the polybutylene adipate terephthalate (PBAT) and a polyhydroxyalkanoate.

Preferably, the mixture comprises the polyhydroxyalkanoate in an amount of from 1 to 25% by weight, based on 100% by weight of the combined amount of the aliphatic polyester, the aliphatic-aromatic polyester, and the polyhydroxyalkanoate. More preferably, the mixture comprises the polyhydroxyalkanoate in an amount of from 2 to 22% by weight, based on 100% by weight of the combined amount of the aliphatic polyester, the aliphatic-aromatic polyester, and the polyhydroxyalkanoate. Still more preferably, the mixture comprises the polyhydroxyalkanoate in an amount of 3 to 20 by weight, based on 100% by weight of the combined amount of the aliphatic polyester, the aliphatic-aromatic polyester, and the polyhydroxyalkanoate. Still more preferably, the mixture comprises the polyhydroxyalkanoate in an amount of from 3 to 18% by weight, based on 100% by weight of the combined amount of the aliphatic polyester, the aliphatic-aromatic polyester, and the polyhydroxyalkanoate. Even more preferably, the mixture comprises the polyhydroxyalkanoate in an amount of from 5 to 15% by weight, based on 100% by weight of the combined amount of the aliphatic polyester, the aliphatic-aromatic polyester, and the polyhydroxyalkanoate. In particular, these ranges can be applied when the polyhydroxyalkanoate is a polyhydroxybutyrate-co-hydroxyhexanoate, preferably a poly(3-hydroxybutyrate-co-3-hydroxyhexanoate) (PHBH). Preferably, when the polyhydroxyalkanoate is a polyhydroxybutyrate-co-hydroxyhexanoate, preferably a poly(3-hydroxybutyrate-co-3-hydroxyhexanoate) (PHBH), the melt comprises 20% by weight or less, more preferably 18% by weight or less of the polyhydroxybutyrate-co-hydroxyhexanoate, preferably a poly(3-hydroxybutyrate-co-3-hydroxyhexanoate) (PHBH) based on 100% by weight of the combined amount of an aliphatic polyester, an aliphatic-aromatic polyester and the polyhydroxybutyrate-co-hydroxyhexanoate, preferably the poly(3-hydroxybutyrate-co-3-hydroxyhexanoate) (PHBH).

The ranges for the amounts of the aliphatic polyester, the aliphatic-aromatic polyester and the polyhydroxyalkanoate may be also combined with each other. Accordingly, as illustrative examples, the melt may comprise the aliphatic polyester in an amount of from 42 to 62% by weight, preferably 45 to 55% by weight, the melt may comprise the aliphatic-aromatic polyester in an amount of from 26 to 46% by weight, preferably 30 to 40% by weight, and the melt may comprise the polyhydroxybutyrate in an amount of from 2 to 22% by weight, preferably 3 to 20% by weight, more preferably 3 to 18% by weight, each based on 100% by weight of the combined amount of the aliphatic polyester, the aliphatic-aromatic polyester and the polyhydroxyalkanoate. A person skilled in the art will readily select suitable amounts of one or more of the polymer(s) within the ranges provided herein, so that the total amount of 100% by weight of the combined amount of the aliphatic polyester, the aliphatic-aromatic polyester and the polyhydroxyalkanoate is not exceeded. In particular, these ranges can be applied when the aliphatic polyester is a polybutylene succinate, the aliphatic aromatic polyester is a polybutylene adipate terephthalate, and the polyhydroxyalkanoate is a polyhydroxybutyrate-co-hydroxyhexanoate, preferably a poly(3-hydroxybutyrate-co-3-hydroxyhexanoate) (PHBH). In a very preferred embodiment, the mixture comprises 52% by weight of a polybutylene succinate, 36% by weight of a polybutylene adipate terephthalate and 12% by weight of a polyhydroxybutyrate-co-hydroxyhexanoate, preferably a poly(3-hydroxybutyrate-co-3-hydroxyhexanoate) (PHBH), each based on 100% by weight of the combined amount of the polybutylene succinate, the polybutylene adipate terephthalate and the polyhydroxybutyrate-co-hydroxyhexanoate, preferably the poly(3-hydroxybutyrate-co-3-hydroxyhexanoate) (PHBH).

Optionally, the mixture may further comprise at least one additive. For example, the mixture may comprise at least one additive as generally known to be used in a textile fiber. The optional additives may include, but are not limited to, an additive selected from the group consisting of a flame retardant, a matting agent, a marker for authentication (e.g., a fluorescence marker), an antimicrobial agent, a filler, and any combination thereof.

Preferably, the mixture further comprises a flame retardant. More preferably, the flame retardant is a phosphate. In preferred embodiments, the flame retardant is selected from the group consisting of ammonium dihydrogenphosphate ($[NH_4][H_2PO_4]$), di-ammonium hydrogenphosphate ($[NH_4]_2$ $[HPO_4]$), triammonium phosphate ($[NH_4]_3[PO_4]$) and any combination thereof. More preferably, the flame retardant is selected from the group consisting of ammonium dihydrogenphosphate ($[NH_4][H_2PO_4]$), di-ammonium hydrogenphosphate ($[NH_4]_2[HPO_4]$) and any combination thereof. More preferably, the flame retardant is ammonium dihydrogenphosphate ($[NH_4][H_2PO_4]$) or di-ammonium hydrogenphosphate ($[NH_4]_2[HPO_4]$). Still more preferably, the flame retardant is di-ammonium hydrogenphosphate ($[NH_4]_2[HPO_4]$). Alternatively, or in addition, the flame retardant may be a polyphosphate. Preferably, when the flame retardant is a polyphosphate, the flame retardant is ammonium polyphosphate.

The mixture may comprise the flame retardant in an amount of from 0.01 to 5% by weight, based on 100% by weight of the total weight of the melt. Preferably, the mixture comprises the flame retardant in an amount of from 0.1 to 4% by weight, based on 100% by weight of the total weight of the mixture. More preferably, the mixture comprises the flame retardant in an amount of from 0.2% to 3% by weight, based on 100% by weight of the total weight of the mixture. Still more preferably, the mixture comprises the flame retardant in an amount of from 0.3 to 3% by weight, based on 100% by weight of the total weight of the mixture. Even more preferably, the mixture comprises the flame retardant in an amount of from 0.3 to 2% by weight, based on 100% by weight of the total weight of the mixture. In particular, the foregoing ranges can be applied when the flame retardant is a phosphate or a polyphosphate, preferably, when the flame retardant is di-ammonium hydrogenphosphate ($[NH_4]_2[HPO_4]$).

A person skilled in the art will readily select suitable amount(s) of the additive(s) to be comprised in the mixture. As an illustrative example, the mixture may comprise a total amount of additive(s) of 15% by weight or less, based on 100% by weight of the total weight of the melt. The mixture may comprise a total amount of additive(s) of 10% by weight or less, based on 100% by weight of the total weight of the melt. Preferably, the mixture comprises a total amount of additives of 7% by weight or less, based on 100% by weight of the total weight of the mixture. More preferably, the mixture comprises a total amount of additives of 5% by weight or less, based on 100% by weight of the total weight of the mixture. Still more preferably, the mixture comprises a total amount of additives of 4% by weight or less, based on 100% by weight of the total weight of the mixture. Even more preferably, the mixture comprises a total amount of additives of 3 to 4% by weight, based on 100% by weight of the total weight of the mixture. It is preferred that the mixture comprises a total amount of additives of 7% by weight or less, more preferably 3 to 4% by weight, each based on 100% by weight of the total weight of the mixture, in order to achieve a stiffness of the fiber which is useful for a textile fiber.

The present invention also relates to a use of a mixture comprising an aliphatic polyester, an aliphatic-aromatic polyester, and a polyhydroxyalkanoate for the preparation of a fiber, wherein the fiber is as defined herein.

The present invention also relates to a use of a mixture comprising an aliphatic polyester, an aliphatic-aromatic polyester, and a polyhydroxyalkanoate for the preparation of a hollow fiber.

It is noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

The term "and/or" wherever used herein includes the meaning of "and", "or" and "all or any other combination of the elements connected by said term".

The term "less than" or in turn "greater than" does not include the concrete number. For example, "less than 20" means less than the number indicated. Similarly, "greater than" means greater than the indicated number, e.g., greater than 80% means greater than the indicated number of 80%.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or "including" or sometimes when used herein with the term "having".

When used herein, "consisting of" excludes any element, step, or ingredient not specified in the claim element. When used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

The term "including" means "including but not limited to". "Including" and "including but not limited to" are used interchangeably.

When used herein, the term "about" is understood to mean that there can be variation in the respective value or range (such as pH, concentration, percentage, molarity, time etc.) that can be up to 5%, up to 10% of the given value. For example, if a formulation comprises about 5 mg/ml of a compound, this is understood to mean that a formulation can have between 4.5 and 5.5 mg/ml.

It should be understood that this invention is not limited to the particular methodology, protocols, material, reagents, and substances, etc., described herein and as such can vary. The terminology used herein is for the purpose of describing particular embodiments only and is not intended to limit the scope of the present invention, which is defined solely by the claims.

All publications cited throughout the text of this specification (including all patents, patent application, scientific publications, instructions, etc.), whether supra or infra, are hereby incorporated by reference in their entirety. Nothing herein is to be construed as an admission that the invention is not entitled to antedate such disclosure by virtue of prior invention. To the extent the material incorporated by reference contradicts or is inconsistent with this specification, the specification will supersede any such material.

The content of all documents and patent documents cited herein is incorporated by reference in their entirety.

A better understanding of the present invention and of its advantages will be provided by the following examples, offered for illustrative purposes only. The examples are not intended to limit the scope of the present invention in any way.

EXAMPLES

Example 1: Preparation of a Fiber According to an Embodiment of the Invention The following components (polymer I, polymer II, polymer III and a masterbatch of additives) were used for preparation of a fiber in accordance with an embodiment of the invention:

Polymer I: Polybutylene succinate (PBS, Mitsubishi Chemicals Bio PBS FZ71, bio-based)

Polymer II: Polybutylene adipate terephthalate (PBAT, BASF ECOFLEX PBAT)

Polymer III: Poly(3-hydroxybutyrate-co-3-hydroxyhexanoate) (PBHB, KANEKA AONILEX X151A, bio-based)

Masterbatch: The masterbatch comprises the additives in the amounts as indicated in the following Table 1

TABLE 1

| | | |
|---|---|---|
| 10% by weight | Zinc sulfide (Kremer Zinksulfid 46350, Kremer Pigmente GmbH & Co. KG, Aichstetten, Germany) | Matting of the fiber, increase of melting point |
| 22% by weight | di-ammonium hydrogen phosphate ($(NH_4)_2HPO_4$) (EMSURE ®, Sigma Aldrich product number 1.01207, Millipore) | Flame retardant |
| 50 PPB | Fluorescent particles (oligomers from Polysecure GmbH, Freiburg im Breisgau, Germany) | Marker for authentication |
| 13% by weight | SMARTZINC 213 PET Hot Melt (zinc encapsulated with polyethylene therephthalate, Smartpolymer GmbH, Rudolstadt, Germany) | Antimicrobial agent |
| 55% by weight | Filler (wood plastic composite (WPC)) Chromated copper arsenate (CCA)-free High-purity lignin GRAANUL Biotech (Sweet Woods), Tallinn, Estonia | Filler |
| 100% by weight (sum) | | |

Figure 2B:
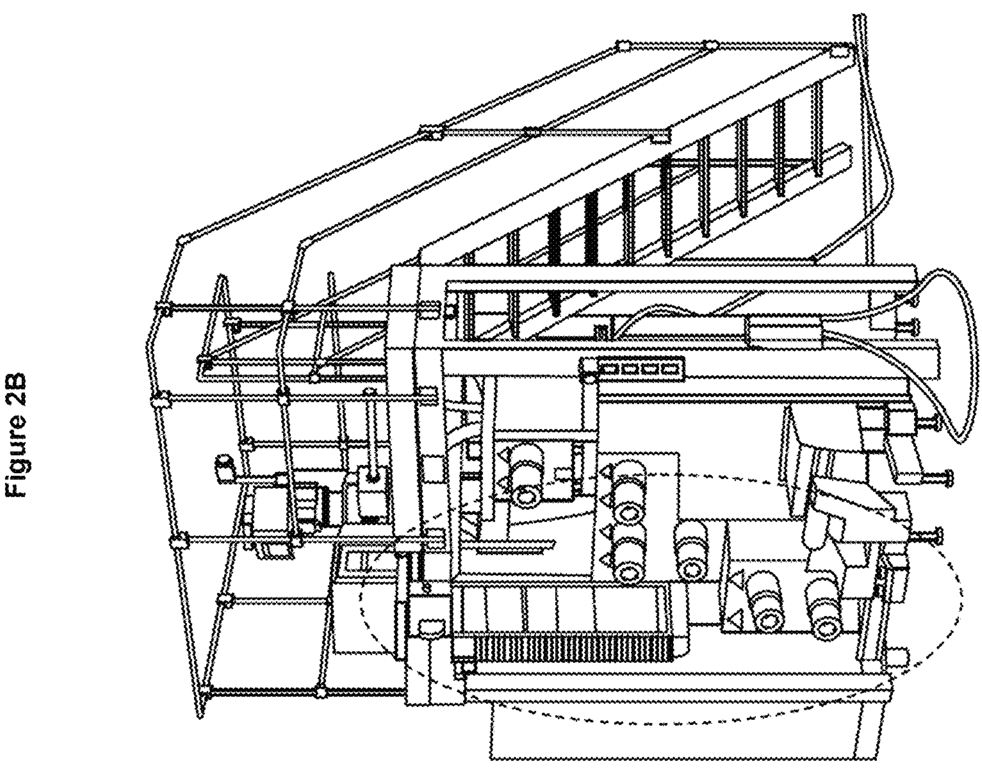
FIG. 2B shows a photograph of another melt spinning apparatus which can be used for preparing a fiber according to an embodiment of the invention. Again, the oval highlights the air cooling aggregates of the melt spinning apparatus.
Figure 2A:
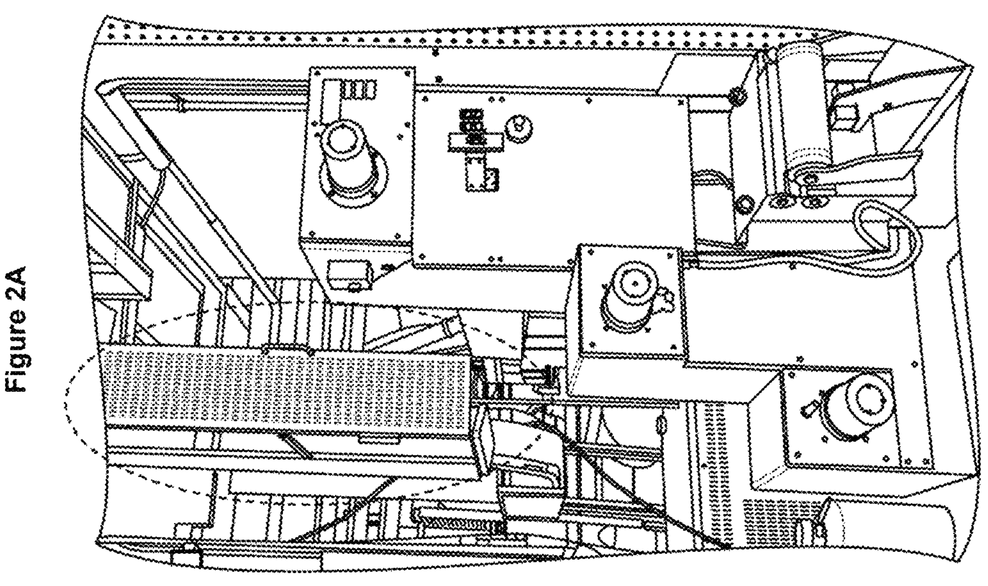
FIG. 2A shows a photograph of a melt spinning apparatus which can be used for preparing a fiber according to an embodiment of the invention. The oval highlights the air cooling aggregates of the melt spinning apparatus.

A fiber according to an embodiment of the invention was prepared using a Fourné Pilot Melt Spintester (Fourné Maschinenbau GmbH, Alfter-Impekoven, Germany) with a retrofitted module for side flow allowance of the masterbatch additives, and a hollow fiber spinning nozzle (for example, a hollow fiber spinning nozzle as described in EP2112256 B1 can be used), and a fiber after treatment line; a Fourné Pilot Melt Spintester is shown in FIG. 2B. Further external processing was carried out on the fiber aftertreatment line using the steps of reed, intake structure, dipping bath, drafting system I, stretching bath, drafting system II, steaming, drafting system III, reviving roller, crimping, drying and staple cutting machine. Alternatively, also other melt spinning apparatuses can be used; an example of an alternative melt spinning apparatus is shown in FIG. 2A.

Polymer I (15,600 g, polybutylene succinate (PBS)), polymer II (10,800 g, polybutylene adipate terephthalate (PBAT)) and polymer III (3,600 g, poly(3-hydroxybutyrate-co-3-hydroxyhexanoate) (PHBH)) were added as granules to the melt spintester. Further, 1.650 kg of the masterbatch (additives) in powder form was added via the simple screw feeder into the module for side flow allowance. The moisture content was about 0.1% by weight. Polymers I, II and III, and the masterbatch (additives) were dried at 60° C. for 24 hours in a vacuum drying cabinet before the addition.

The following process parameters were used:

flow rate: 2.5 kg/h up to 5.12 m/min tow;

processing temperature: 250° C.;

distance between hollow fiber spinning nozzle and godet: 200 cm;

take-off godet: 85° C. 800 m/min;

godet roller 1:80° C. 980 m/min;

godet roller 2:80° C. 1350 m/min;

the air cooling aggregate is turned on one side of the precursor fiber to provide an air flow onto the precursor fiber from the one side; and the air cooling is turned off on the opposite side of the precursor fiber by providing a baffle between the air cooling aggregate and the precursor fiber, thus preventing an air flow from the opposite side to the one side. Accordingly, the precursor fiber was cooled under a temperature gradient.

A melt spinning apparatus and a process for the preparation of the fiber is schematically depicted in FIG. 1. The melt spinning apparatus of FIG. 1 comprises a hollow fiber spinning nozzle 1. A melt comprising the three polymers, which in the present Example has a processing temperature of 250° C., is spun through the hollow fiber spinning nozzle 1, by using an extruder, to obtain a hot precursor fiber 3. An air flow 7 is provided onto the precursor fiber 3 from the left side, in a substantially vertical direction relative to a longitudinal direction of the precursor fiber 3, to cool the precursor fiber 3. The air flow 7 may be provided by an air cooling aggregate, which is schematically implied by the snow flake on the left. In the present example, the air used for the air flow 7 has ambient temperature (about 20° C.). An air flow 9 is provided from the right side. Also the air flow 9 may be provided by an air cooling aggregate, which is schematically implied by the snow flake on the right. A baffle 5 is positioned between the air flow 9 and the precursor fiber 3. Thus, the baffle 5 prevents the air flow 9 from the right to reach the precursor fiber 3 over a portion of the precursor fiber 3 that is covered by the baffle 5. Accordingly, only air flow 7 from the left side reaches the precursor fiber 3. As a result, the precursor fiber 3 has a lower temperature on the left side, where the air flow 7 impinges onto the precursor fiber 3, than on the right side, from which the air flow 9 is prevented by the baffle 5. Hence, the precursor fiber 3 is cooled under a temperature gradient. The cooling under the temperature gradient results in the fiber 11. The fiber 11 is then wound up by godet rolls 13.

Alternatively, instead of using a baffle, one of the two air cooling aggregates of the melt spinning apparatus may be switched off, so that an air flow is, again, provided only from one side onto the precursor fiber 3.

The present example uses a Fourné Pilot Melt Spintester (Fourné Maschinenbau GmbH, Alfter-Impekoven, Germany), which is depicted in FIG. 2B. Alternatively, any other suitable melt spinning apparatus can be used, such as e.g. the larger melt spinning apparatus depicted in FIG. 2A. Both in FIG. 2A and FIG. 2B ovals are drawn to mark the air cooling aggregates, which are equipped with grids.

Figure 3:
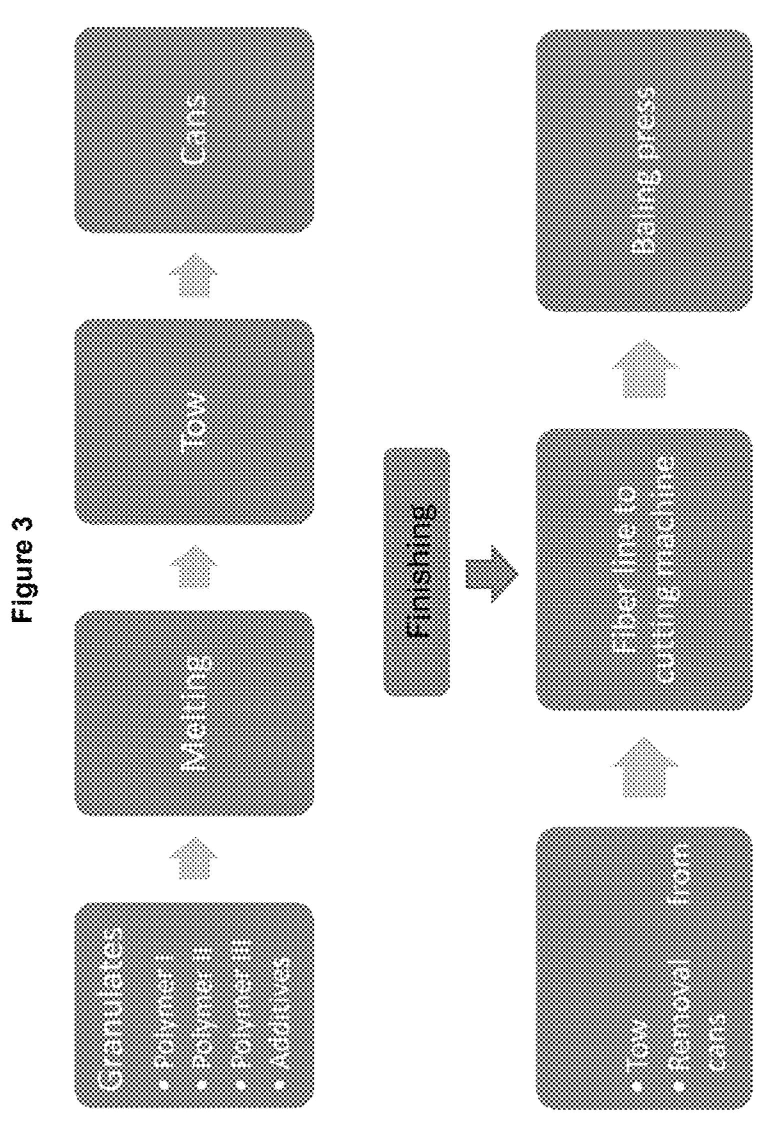
FIG. 3 shows a schematic representation of a production process of a fiber which includes further treatment of the fiber on a fiber after treatment line according to an embodiment of the invention.

FIG. 3 shows an extended scheme of preparing a fiber and further processing of the fiber by after treatment, according to an embodiment of the invention. As indicated in FIG. 3, the fiber may undergo, e.g., finishing, cutting and pressing into bales.

Figure 4:
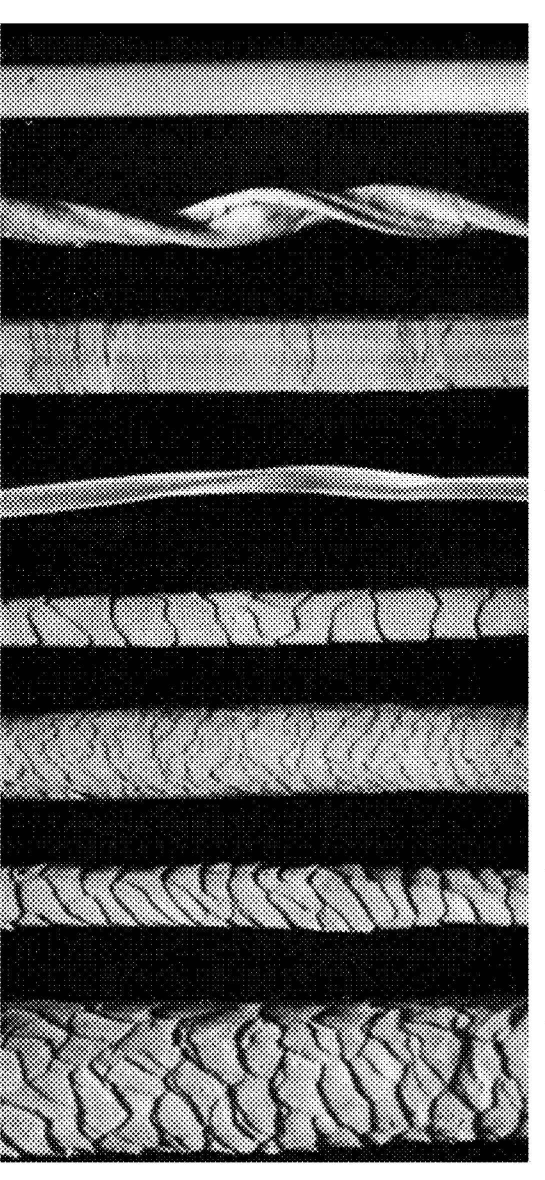
FIG. 4 shows various fibers which are conventionally used for the production of textiles. From left to right are shown fibers of coarse wool, fine wool, alpaca, cashmere, silk, linen, cotton, and polyester.

FIG. 4 shows fibers which are commonly used for producing textiles. From left to right are shown corse wool, fine wool, alpaca, cashmere, silk, linen, cotton, and polyester fibers.

Figure 5A:
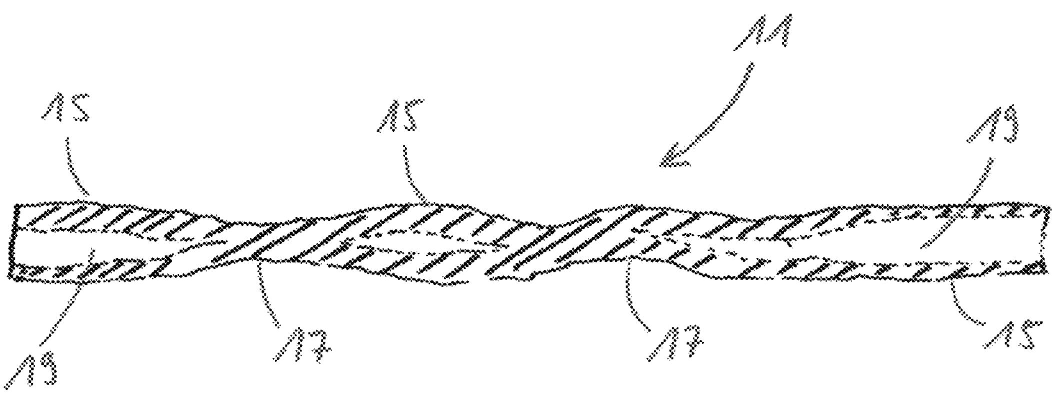
FIG. 5A shows a schematic representation of a fiber according to an embodiment of the invention. This fiber comprises thicker portions having a cavity and thinner portions having a compact or condensed structure.
Figure 5B:
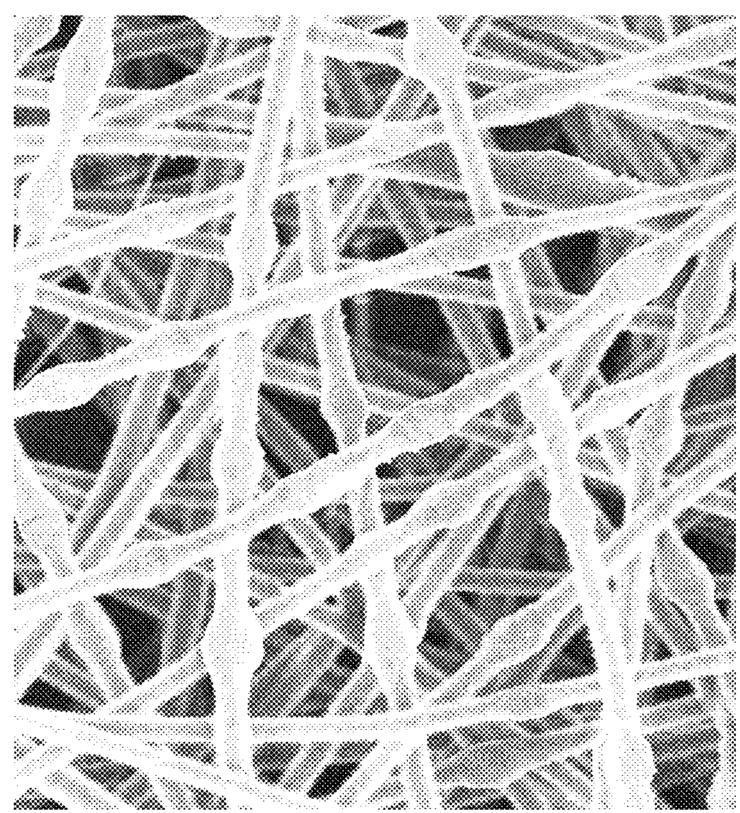
FIG. 5B shows an electron micrograph of fibers according to an embodiment of the invention, which have thicker portions and thinner portions (relative to each other).
Figure 5C:
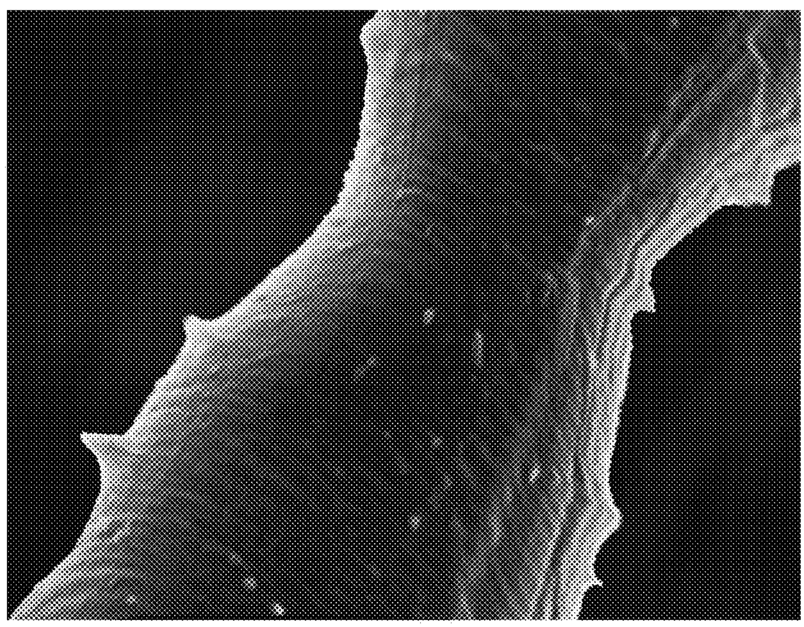
FIG. 5C shows an electron micrograph of a thinner portion of a fiber according to an embodiment of the invention, which is arranged between two thicker portions.
Figure 5D:
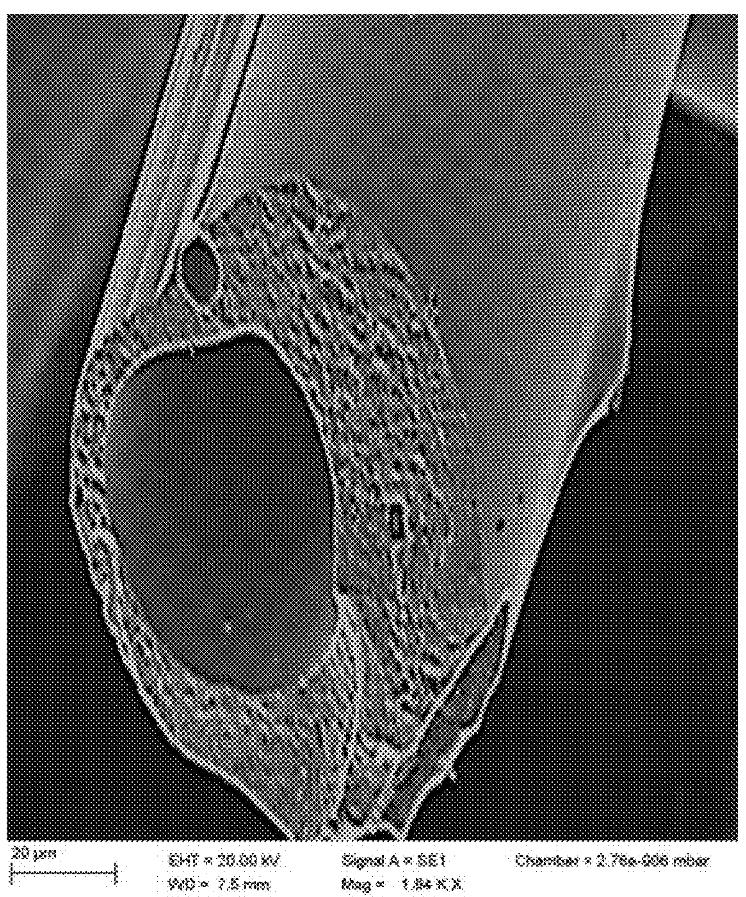
FIG. 5D shows an electron micrograph of a cross-section of a fiber according to an embodiment of the invention, wherein a cavity can be seen.
Figure 5E:
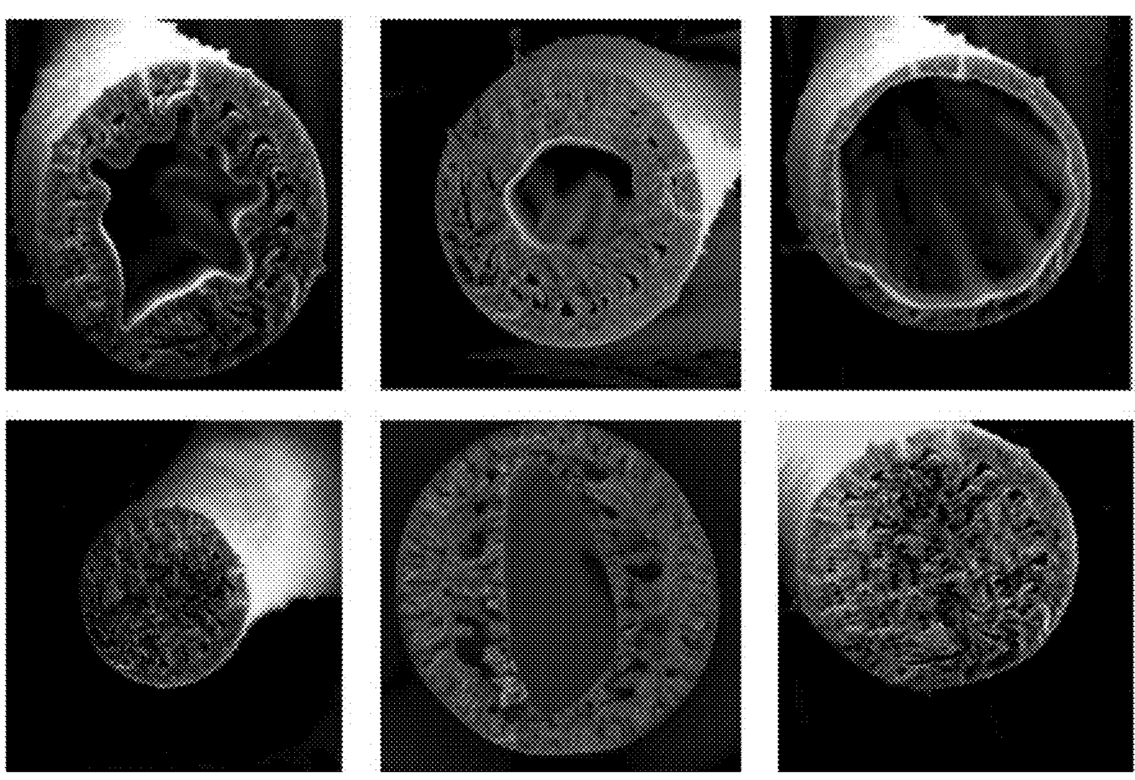
FIG. 5E shows further electron micrographs of cross-sections of a fiber according to an embodiment of the invention. The three micrographs in the upper panel and the micrograph in the middle of the lower panel show cross-sections of thicker portions of the fiber, which comprise a cavity. The micrographs on the left and the right of the lower panel show cross-sections of thinner portions of the fiber, which have a compact or condensed structure.
Figure 5F:
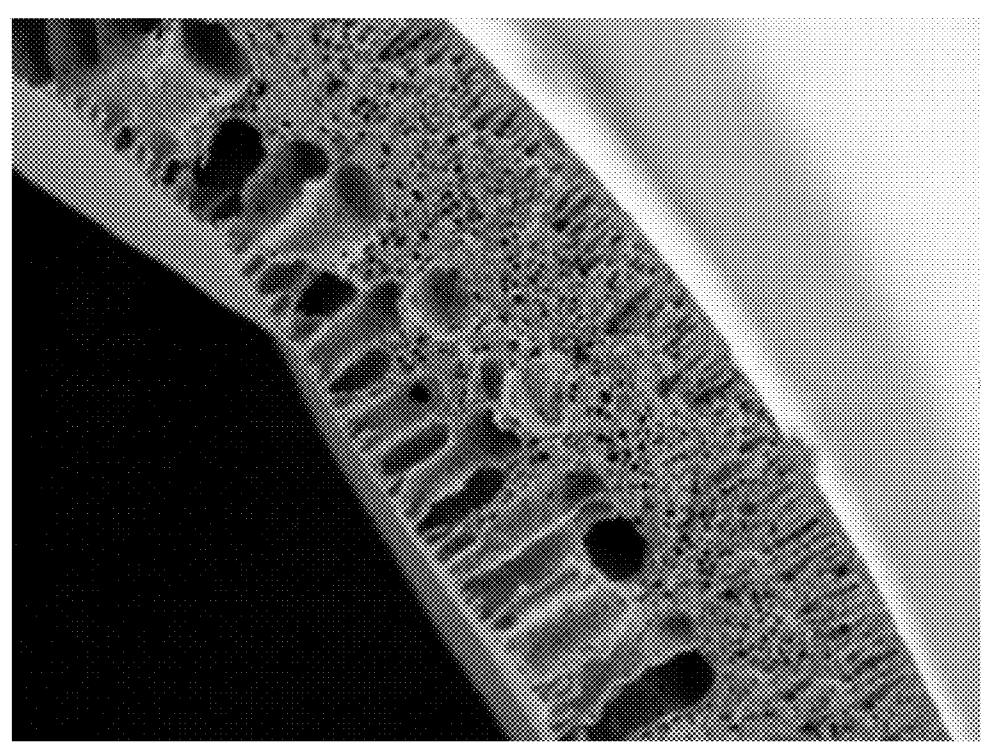
FIG. 5F shows an electron micrograph of a section of an outer wall of a cavity of a fiber according to an embodiment of the invention.

FIGS. 5A, 5B, 5C, 5D, 5E and 5F show fibers according to embodiments of the invention, which have been produced using cooling of a precursor fiber under a temperature gradient, as e.g. described in the present Example 1. FIG. 5A shows a schematic representation of a fiber according to an embodiment of the invention. The fiber 11 comprises thicker portions 15 and thinner portions 17. The thicker portions comprise cavities 19. FIG. 5B shows an electron micrograph of fibers according to an embodiment of the invention. The thicker portions and the thinner portions can be distinguished. FIG. 5C shows an electron micrograph of a fiber according to an embodiment of the invention. The micrograph shows a thinner portion of the fiber which is arranged between two thicker portions. The fiber has a substantially smooth outer surface. FIG. 5D shows an electron micrograph of a cross-section of a fiber according to an embodiment of the invention. A cavity is visible. FIG. 5E shows further electron micrographs of cross-sections of a fiber according to an embodiment of the invention. The three micrographs of the upper panel and the micrograph in the middle of the lower panel show cross-sections of thicker portions of the fiber. A cavity is visible. The cavity may have an irregular circumference towards the outer wall of the fiber. The outer wall comprises pores. The micrographs on the left and the right of the lower panel show cross-sections of thinner portions of the fiber. Compared to the cavities of the thicker portions, the thinner portions have a compact or condensed structure. As can be seen, the thinner portions have pores. FIG. 5F shows an electron micrograph of a cross-section of an outer wall of a cavity of a fiber according to an embodiment of the invention. Again, it can be seen that the outer wall has a porous structure.

Figure 8:
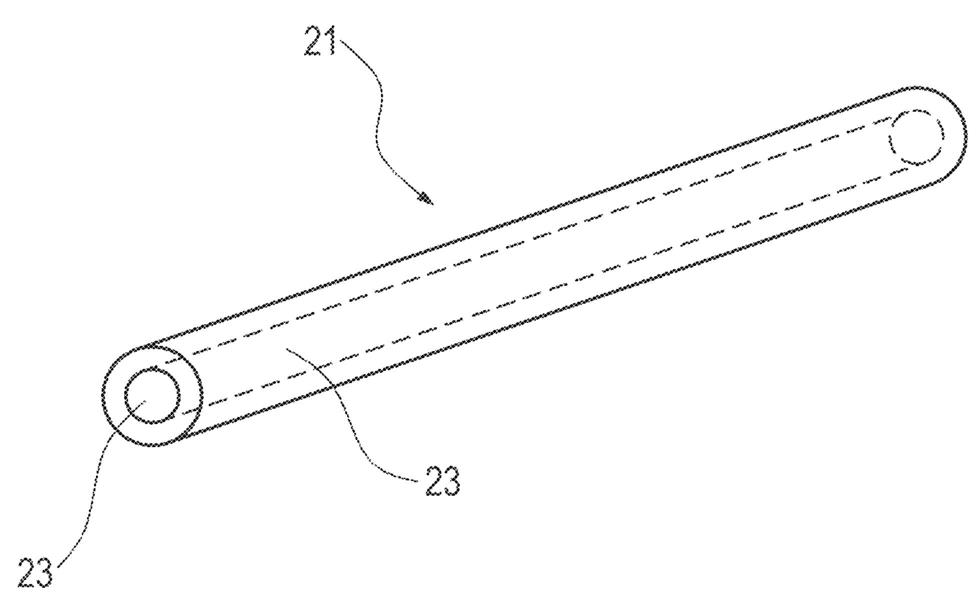
FIG. 8 shows a schematic representation of a hollow fiber according to an embodiment of the invention, which has a continuous cavity.

FIG. 8 shows a schematic representation of a hollow fiber 21 according to an embodiment of the invention. The hollow fiber 21 has a continuous cavity 23. Such hollow fiber can be prepared using conventional melt spinning processes without applying a temperature gradient.

Example 2: Antimony Content Test

The antimony content of a fiber obtained using cooling under a temperature gradient as e.g. in Example 1 was tested by the Laboratory Dr. Matt, Schaan, Liechtenstein. In principle, antimony, which is a toxic element, can be present as residues from the catalysts used during the production process of the polymers.

The antimony content was tested as follows:

The fibers of Example 1 were inserted into water and (a) heated to the boiling point of water; (b) stored in the water for 8 weeks; and (c) further stored 4 weeks in a glass with water and air (closed, ⅓ of air, ⅔ of water).

No antimony could be detected in the fiber and in the water (antimony S6<0.1 mg/kg ICP-MS). Thus, this test shows that the fiber can be prepared without using toxic antimony.

Example 3: Moisture Absorption Test

In this example, the moisture absorption of a fiber according to an embodiment of the invention, obtained using cooling under a temperature gradient as e.g. in Example 1, was tested in comparison to a commercially available cotton fiber and two further commercial synthetic fibers, i.e. a polyester (PES) fiber and a polybutylene succinate (PBS) fiber. In addition, also the drying properties of the fibers were tested. The fibers and the sources are described in the following Table 2:

TABLE 2

| Fiber | Supplier/ Manufacturer | Description |
|---|---|---|
| Fiber according to an embodiment of the invention (obtained using cooling under a temperature gradient) | OceanSafe AG, Bern, Switzerland | Fiber according to an embodiment of the invention (obtained using cooling under a temperature gradient), Staple 32 mm/1.1 den |
| Cotton | OceanSafe AG, Bern, Switzerland | Cotton from controlled biological cultivation in Denizli, GOTS certified, Staple about 28 mm/1.2 den |
| Polyester (PES) | Kücukcalik Tekstil, Inegöl, Turkey | Polyester fiber, staple 30 mm/1.2 den |
| Polybutylene succinate (PBS) | JZ-Fibers (Shaoxing Global Chemical Fiber Co., Ltd.), Shaoxing City, Zhejiang Province, China | Polybutylene succinate fiber, staple 32 mm/1.2 den |

Figure 6A:
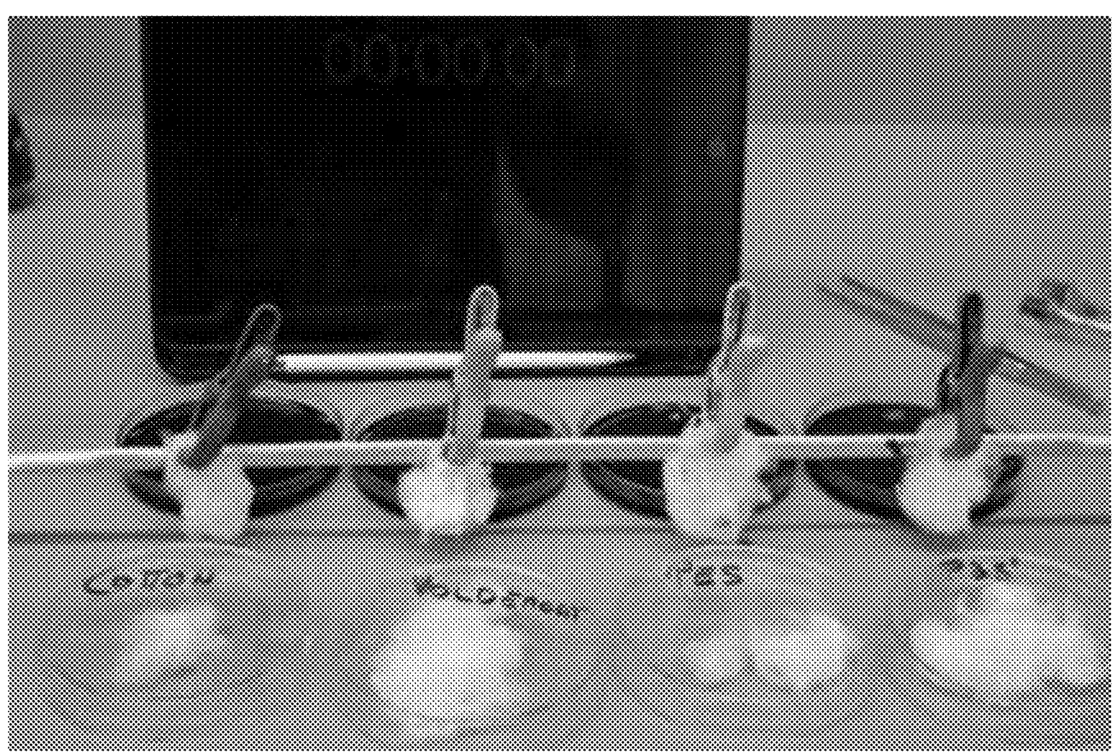
FIG. 6A shows the setup of a test of the moisture absorption of a cotton fiber, a fiber according to an embodiment of the invention (obtained by using cooling under a temperature gradient), a polyester fiber and a polybutylene succinate fiber (from left to right).

The setup for the test of the moisture absorption is depicted in FIG. 6A. Four fiber balls (from left to right: cotton, fiber according to an embodiment of the invention (obtained using cooling under a temperature gradient), polyester (PES), polybutylene succinate (PBS), each about 4 cm long, are attached to a rod with clamps. The fiber balls are prepared such that, upon visual inspection, they have approximately the same length and volume.

Figure 6B:
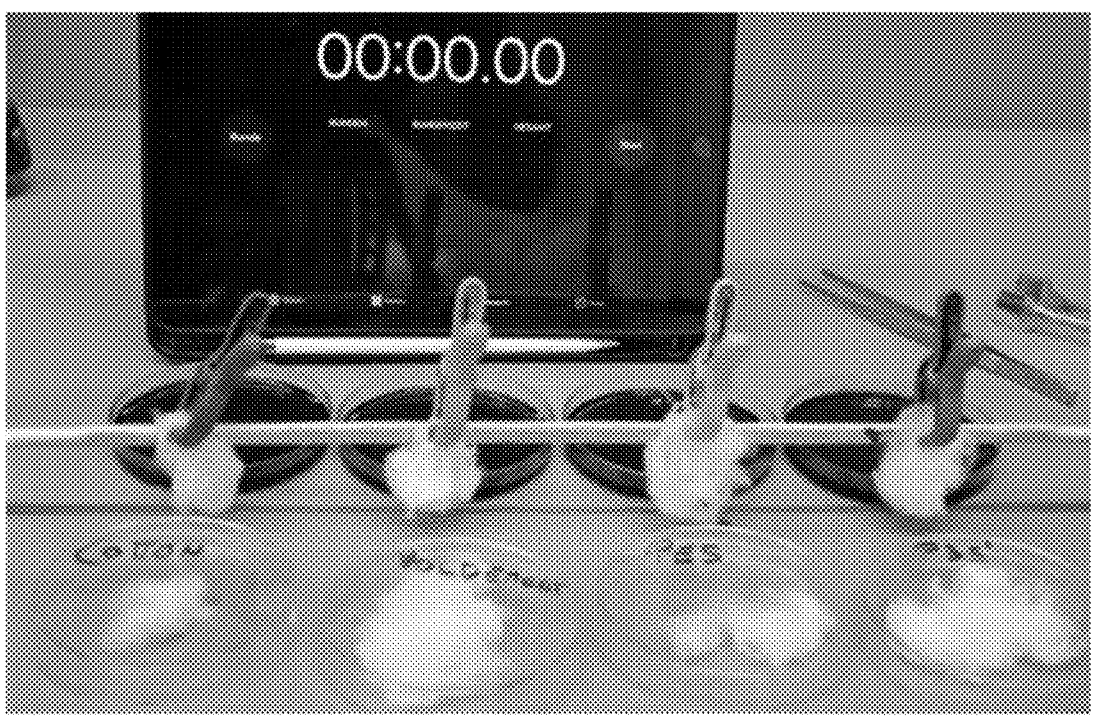
FIG. 6B shows the test setup of the moisture absorption of a cotton fiber, a fiber according to an embodiment of the invention (obtained by using cooling under a temperature gradient), a polyester (PES) fiber and a polybutylene succinate (PBS) fiber (from left to right) immediately before the test. Four fiber balls are immersed approximately 1 cm into the colored liquid at the same time. The time measurement is started when immersing the fiber balls into the liquid.

FIG. 6B shows the test setup immediately before the test. Four petri dishes are filled with water and about 3% by volume of blue ink in order to provide blue water, which is also denoted herein as “colored water”, a “liquid” or “colored liquid”. The test is carried out as follows: The four fiber balls are slightly moisturized with a water sprayer in order to provide them with an equal moisture content before starting the test. The weight of the fiber balls is determined before immersion into the colored liquid. The weight of the fiber balls is given in Table 3 below. Then the rod with the four fiber balls (from left to right: cotton, fiber according to an embodiment of the invention (obtained by using cooling under a temperature gradient), polyester (PES), polybutylene succinate (PBS)) is hung down so that the four fiber balls are immersed about 1 cm into the colored liquid at the same time. The time measurement is started when immersing the fiber balls into the liquid.

Figure 6C:
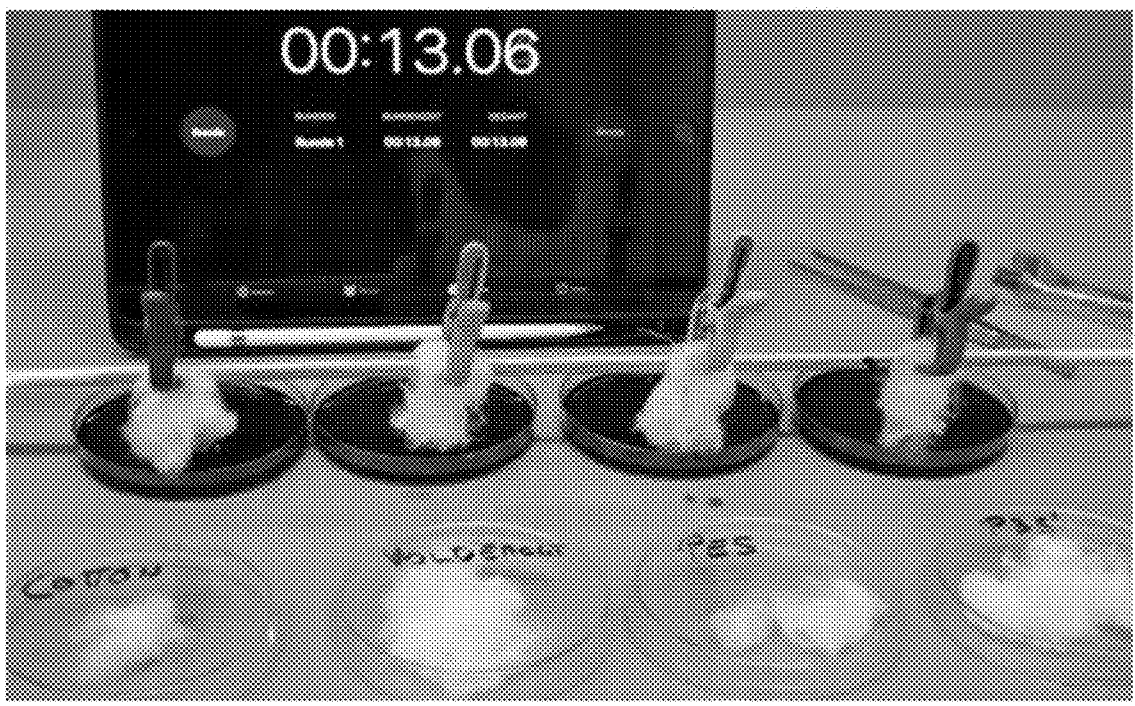
FIG. 6C shows the test about 13 seconds after immersing the fiber balls into the liquid.
Figure 6D:
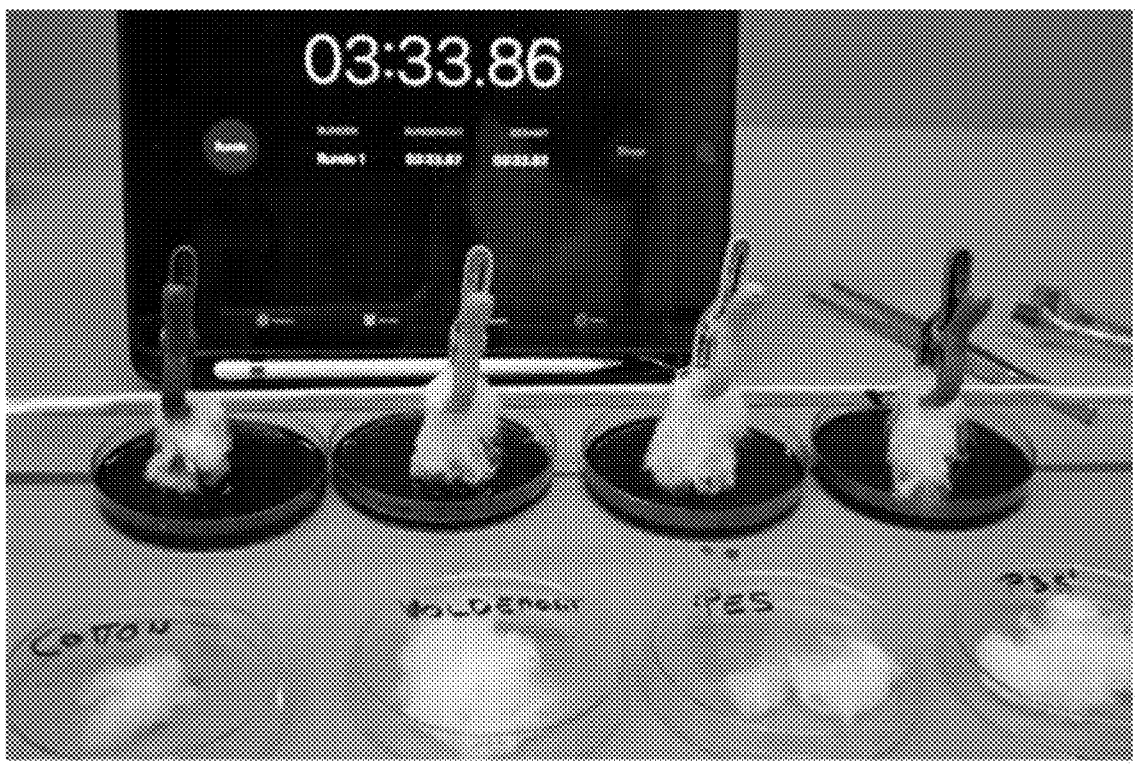
FIG. 6D shows that, after approximately 3.5 minutes from immersing the fiber balls into the liquid, staining is visible for the cotton fiber and the fiber according to an embodiment of the invention (obtained by using cooling under a temperature gradient). In general, staining of the cotton fiber and the fiber according to an embodiment of the invention can be observed after two minutes from immersing the fiber balls into the liquid.
Figure 6E:
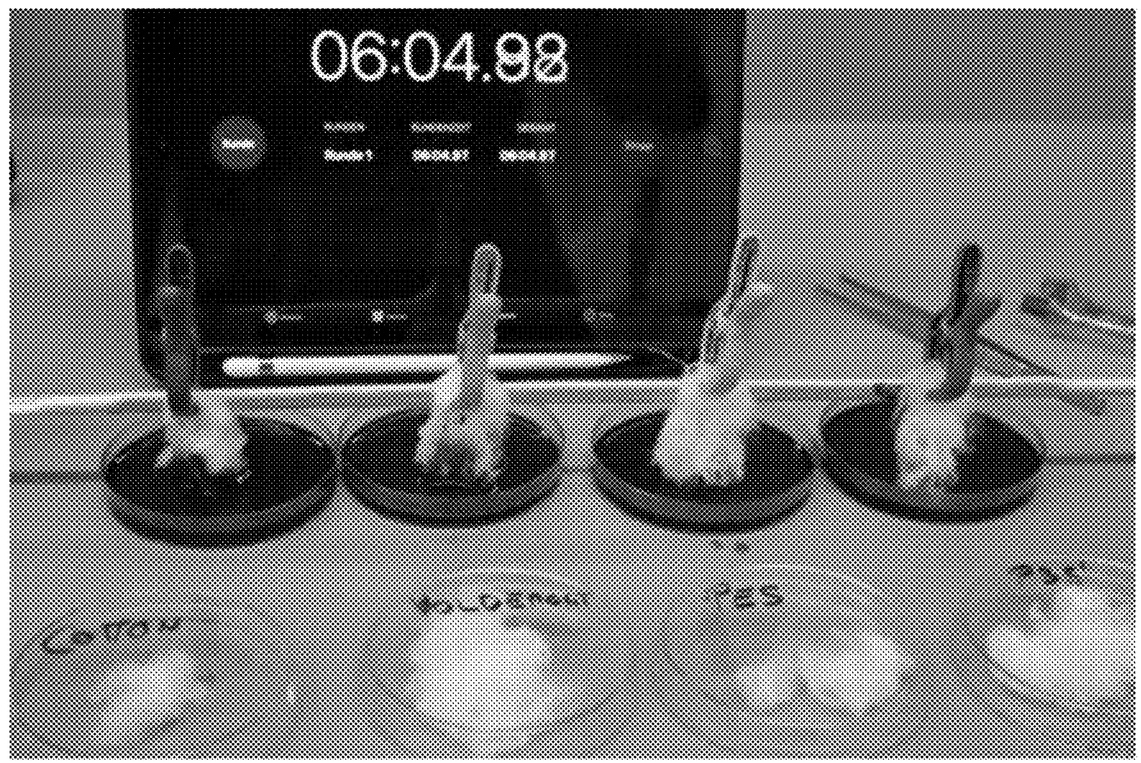
FIG. 6E shows that, after 6 minutes from immersing the fiber balls into the liquid, the parts of the cotton fiber and the fiber according to an embodiment of the invention (obtained by using cooling under a temperature gradient, which are immersed into the liquid, are significantly swollen. The PBS fiber ball shows a very slight staining in the middle.
Figure 6F:
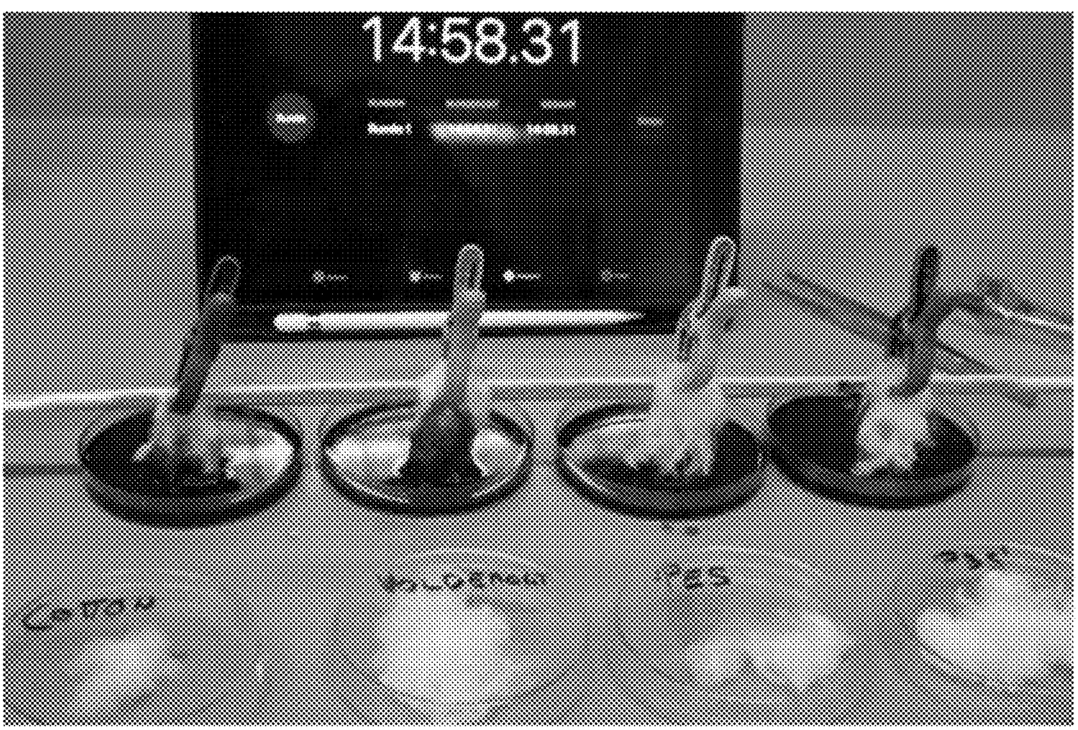
FIG. 6F shows the test immediately before stopping after 15 minutes from immersing the fiber balls into the liquid. It can be seen that the fiber ball comprising the fiber according to an embodiment of the invention (obtained by using cooling under a temperature gradient, second from the left) substantially keeps its shape. In the fiber ball according to an embodiment of the invention (second from the left) the liquid has moved up higher than in the cotton fiber ball (first on the left). At the bottom of the cotton fiber ball a clumping can be observed resulting from the swelling.
Figure 7:
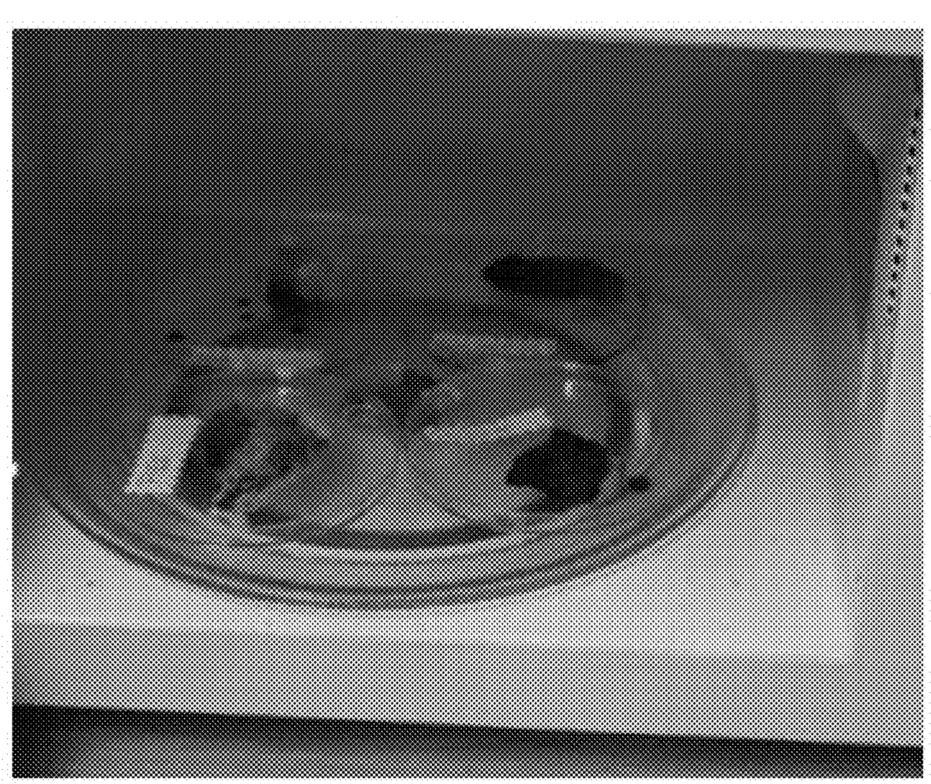
FIG. 7 shows drying of the fiber balls in petri dishes at 40° C. for 10 minutes.

The staining over the time is documented with a photo camera. FIG. 6C shows the test about 13 seconds after immersing the fiber balls into the liquid. FIG. 6D shows that, after approximately 3.5 minutes from immersing the fiber balls into the liquid, staining is visible for the cotton fiber (first on the left) and the fiber according to an embodiment of the invention (obtained using cooling under a temperature gradient, second from the left). In general, staining of the cotton fiber and the fiber according to an embodiment of the invention can be observed from 2 minutes onwards after immersing the fiber balls into the colored liquid. FIG. 6E shows that, after 6 minutes from immersing the fiber balls into the liquid, those parts of the cotton fiber and the fiber according to an embodiment of the invention (obtained using cooling under a temperature gradient), which are in direct contact with the liquid, are significantly swollen. It is noted that also the PBS fiber ball (fourth from the left) shows a very slight staining in the middle, which, however, was not visible when repeating the test. FIG. 6F shows the test immediately before stopping after 15 minutes from immersing the fiber balls into the liquid. After 15 minutes in the blue liquid, the fiber balls are lifted out of the liquid at the same time. The fiber balls are hung over the Petri dishes for 1 minute to drain. The fiber balls were compared by visual inspection, and weighed (in this regard, the weight of the fiber balls was determined before immersion into the colored water and compared after removing the fibers and after draining). The fiber balls are then dried for 10 minutes at 40° C. and weighed again. FIG. 7 shows the drying of the fiber balls in petri dishes at 40° C. for 10 minutes. The results are given in Table 3.

TABLE 3

| | Cotton | Fiber according to an embodiment of the invention* | Polyester (PES) | Polybutylene succinate (PBS) |
|---|---|---|---|---|
| Supplier | OceanSafe AG | OceanSafe AG | Kücukcalic | Jz-fibers |
| Product | Fiber | Fiber | Fiber | Fiber |
| Dimension | 28 mm 1.2 den | 32 mm 1.1den | 30 mm 1.2 den | 32 mm 1.2 den |
| Bio-degradable EN 13432 | yes | yes | no | yes |
| Heavy metal (residues of catalyst) | no | no | yes | no |
| Weight fiber ball (grams) | 1.850 | 1.620 | 1.500 | 1.600 |
| Approximate length fiber ball (mm) | 40 | 40 | 40 | 40 |
| Visual staining in vertical direction (mm between surface of the water and clamp) | | | | |
| After 2 minutes (approx. mm) | 0-4 | 0-6 | 0-1 | 0 |
| After 6 minutes (approx. mm) | 4-7 | 3-9 | 1 | 0** |
| After 15 minutes (approx. mm) | 4-7 | 5-12 | 1 | 0** |

TABLE 3-continued

| | Cotton | Fiber according to an embodiment of the invention* | Polyester (PES) | Polybutylene succinate (PBS) |
|---|---|---|---|---|
| Weight of fiber ball after 15 min in the liquid (grams) | 3.510 | 3.140 | 1.630 | 1.640 |
| Weight difference to dry fiber ball, after 15 min in the liquid (grams) | 1.660 | 1.520 | 0.160 | 0.04 |
| Weight of fiber ball after 15 min in the liquid and approx. 1 min draining (grams) | 3.010 | 3.060 | 1.580 | 1.620 |
| Weight difference to dry fiber ball, after 15 min in the liquid and approx. 1 min draining (grams) | 1.160 | 1.440 | 0.010 | 0.020 |
| Weight of fiber ball after 10 min drying at 40° C. (grams) | 2.760 | 2.360 | 1.530 | 1.600 |
| Weight difference to dry fiber ball, after 10 min drying at 40° C. (grams) | 0.910 | 0.640 | 0.030 | 0 |
| Grip after 10 min drying | very wet | moist | dry | dry |

*Fiber obtained using cooling under a temperature gradient, as described e.g. in Example 1.

**In one test run partially up to 8 mm; however, this could not be reproduced (it is assumed that this result was obtained with a fiber which was contaminated with disinfecting agent).

As can be seen in FIG. 6F, after 15 minutes immersion into the blue liquid, the fiber ball according to an embodiment of the invention (obtained using cooling under a temperature gradient, second from the left) substantially keeps its shape. In the fiber ball according to an embodiment of the invention (second from the left) the liquid has moved up higher than in the cotton fiber ball (first on the left). At the bottom of the cotton fiber ball a clumping can be observed resulting from the swelling.

The fiber according to an embodiment of the invention (obtained using cooling under a temperature gradient) and cotton absorbed the most of the liquid, see Table 3, the "weight difference to dry fiber ball, after 15 min in the liquid". After the draining phase, the fiber according to an embodiment of the invention retained more of the liquid than cotton, both in absolute and percentage values, see Table 3, the "weight difference to dry fiber ball, after 15 min in the liquid and approx. 1 min of draining". The time required for drying of the fiber according to an embodiment of the invention is significantly shorter than for cotton, which follows from Table 3, see the "weight difference after 10 min drying at 40° C.". In contrast to the two other synthetic fibers (PES and PBS), the fiber according to an embodiment of the invention is capable to absorb a liquid.

In conclusion, the fiber according to an embodiment of the invention (obtained using cooling under a temperature gradient) has a slightly better moisture absorption than cotton. Further, the fiber according to an embodiment of the invention has significantly better properties when drying. Accordingly, the fiber according to an embodiment of the invention can be used to produce surfaces that absorb moisture and allow it to dry again with less energy than required for cotton.

Example 4: Further Characteristics of a Fiber According to an Embodiment of the Invention Further characteristics of the fiber according to an embodiment of the invention (obtained using cooling under a temperature gradient, as e.g. in Example 1) compared to known commercially available fibers used for the production of textiles are set out in the following Table 4.

TABLE 4

| Staple | Flame retardant (B1) | Hydrophilic | Free of Antimony | Bio-degradable EN 13432 | Dirt-repellent | Wrinkle-resistant | Possible with proportion of renewable raw materials | Water consumption/kg | Land consumption per 1 ton (1000 kg) of fiber |
|---|---|---|---|---|---|---|---|---|---|
| Fiber according to an embodiment of the invention* | X | X | X | X | X | X | X | 0.4% | 0.19 |
| Diolen | | | | | X | X | | 0.5% | 0.002 |
| Trevira CS | X | | | | X | X | | 0.5% | 0.002 |

TABLE 4-continued

| Staple | Flame retardant (B1) | Hydrophilic | Free of Antimony | Bio-degradable EN 13432 | Dirt-repellent | Wrinkle-resistant | Possible with proportion of renewable raw materials | Water consumption/kg | Land consumption per 1 ton (1000 kg) of fiber |
|---|---|---|---|---|---|---|---|---|---|
| Tencel | | X | X | X | | | X | 1.5% | 0.24 |
| Viscose (Lenzing) | | X | X | X | | | X | 2.6% | 0.69 |
| Cotton | | X | X | X | | | X | 50% | 0.82 |
| Wool | X | X | X | X | X | X | X | 100% | 170 |

*Fiber obtained using cooling under a temperature gradient, as described e.g. in Example 1.
"X" denotes that the respective characteristic is fulfilled.

As can be seen from Table 4, the fiber according to an embodiment of the invention (obtained using cooling under a temperature gradient) can be prepared with a flame retardant, is hydrophilic, can be prepared free of antimony, is biodegradable in accordance with EN 13432, is dirt-repellent, is wrinkle resistant, and can be prepared with a proportion of renewable raw materials. The preparation of the fiber according to an embodiment of the invention requires a water consumption which is much lower than for cotton. Further, the area requirement per 1 ton (1000 kg) for the preparation of the fiber according to an embodiment of the invention is also much lower than for cotton. Accordingly, the fiber according to an embodiment of the invention is beneficial from an ecological point of view compared to cotton.

Figure 9C:
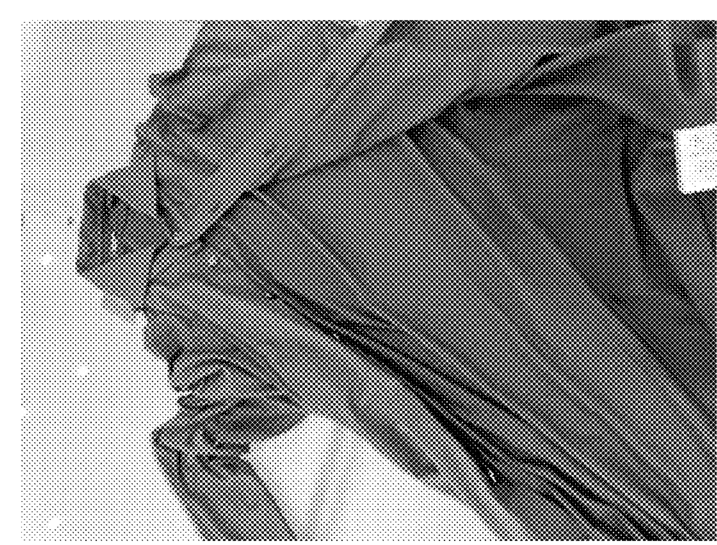
FIG. 9C shows a further view of the shirt which has been manufactured using the fiber according to an embodiment of the invention, in particular a yarn made from the fiber.
Figure 9B:
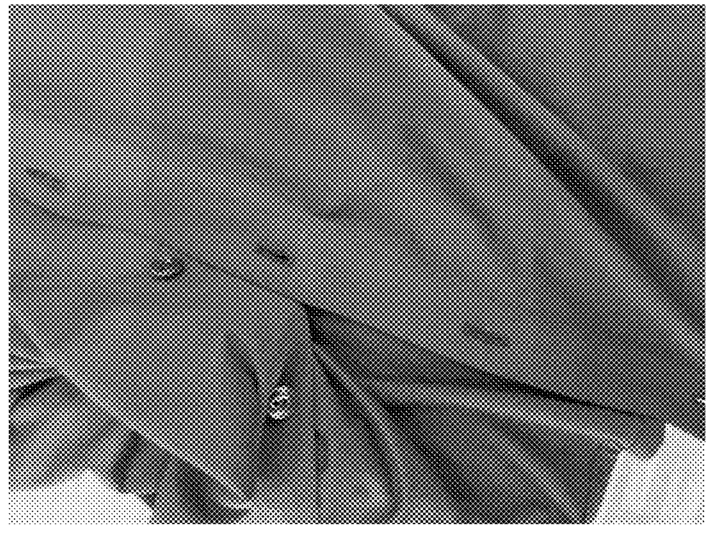
FIG. 9B shows another view of the shirt which has been manufactured using the fiber according to an embodiment of the invention, in particular a yarn made from the fiber.
Figure 9A:
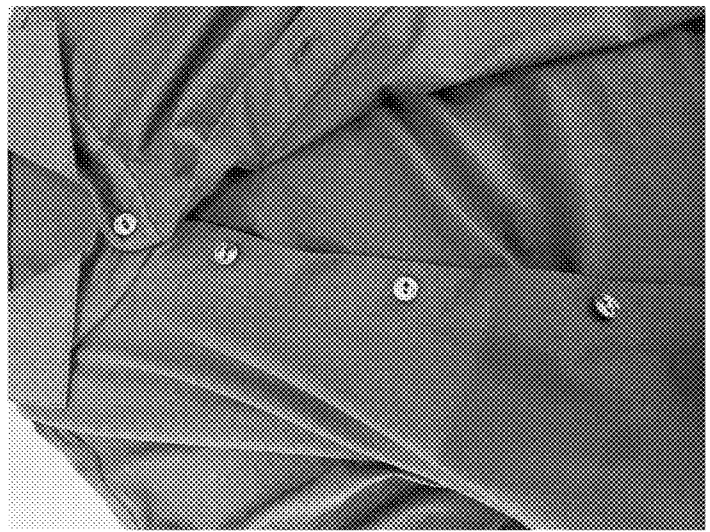
FIG. 9A shows a photograph of a shirt which has been manufactured using a fiber according to an embodiment of the invention (in particular a yarn made from the fiber), which has been obtained using cooling under a temperature gradient.

Example 5: Clothing Comprising a Fiber According to an Embodiment of the Invention A fiber according to an embodiment of the invention (obtained using cooling under a temperature gradient, as e.g. in Example 1), in particular a yarn made from the fiber, has been used to produce a shirt. Various views of the shirt are shown in FIGS. 9A, 9B and 9C. The shirt comprises about 40% of the fiber according to an embodiment of the invention, and about 60% cotton.

The invention is further characterized by the following items:

1. A fiber obtainable or being obtained by a method comprising:
   spinning a melt comprising an aliphatic polyester, an aliphatic-aromatic polyester, and a polyhydroxyalkanoate through a hollow fiber spinning nozzle to obtain a precursor fiber; and
   cooling the precursor fiber under a temperature gradient, thereby obtaining the fiber.
2. The fiber of item 1, wherein the temperature gradient is generated by one or more temperature control elements.
3. The fiber of item 2, wherein the one or more temperature control elements are arranged so that the temperature gradient is generated in a substantially vertical direction relative to a longitudinal direction of the precursor fiber.
4. The fiber of item 2 or 3, wherein the one or more temperature control elements are arranged so that the temperature gradient is generated in a substantially parallel direction relative to a cross-section of the precursor fiber.
5. The fiber of any one of items 2 to 4, wherein the one or more temperature control elements are arranged so that a temperature on an outer surface of the precursor fiber is lower than a temperature on an opposite outer surface.
6. The fiber of any one of items 2 to 5, wherein the one or more temperature control elements are arranged so that the precursor fiber is cooled from one side.
7. The fiber of item 6, wherein the cooling is effected by air cooling.
8. The fiber of item 6 or 7, wherein the air cooling is effected by providing an air flow onto the precursor fiber from one side, in a substantially vertical direction relative to a longitudinal direction of the precursor fiber, by using an air cooling aggregate arranged on the one side of the precursor fiber.
9. The fiber of item 8, wherein an airflow from an opposite side to the one side is prevented by switching off an air cooling aggregate arranged on the opposite side of the precursor fiber.
10. The fiber of item 8, wherein an airflow from an opposite side to the one side is prevented by arranging one or more baffles between an air cooling aggregate arranged on an opposite side of the precursor fiber, thereby preventing an air flow from the opposite side onto the precursor fiber at least over a portion along the longitudinal direction of the precursor fiber.
11. The fiber of any one of the preceding items, wherein the aliphatic polyester comprises an aliphatic $C_2$-$C_{20}$ dicarboxylic acid and an aliphatic $C_2$-$C_{12}$ diol.
12. The fiber of any one of the preceding items, wherein the aliphatic polyester is selected from the group consisting of a polybutylene succinate (PBS), a polyethylene oxalate, a polyethylene malonate, a polyethylene succinate, a polypropylene oxalate, a polypropylene malonate, a polypropylene succinate, a polybutylene oxalate, a polybutylene malonate, a polybutylene succinate-co-adipate (PBSA), a polybutylene succinate-co-azelate (PBSAz), a polybutylene succinate-co-brassylate (PBSBr), and any combination thereof.
13. The fiber of any one of the preceding items, wherein the aliphatic polyester is selected from the group consisting of a polybutylene succinate (PBS), a polybutylene succinate-co-adipate (PBSA), a polybutylene succinate-co-azelate (PBSAz), a polybutylene succinate-co-brassylate (PBSBr), and any combination thereof.
14. The fiber of any one of the preceding items, wherein the aliphatic polyester is a polybutylene succinate (PBS).
15. The fiber of any one of the preceding items, wherein the fiber comprises the aliphatic polyester in an amount of from 30 to 70% by weight based on 100% by weight of the combined amount of the aliphatic polyester, the aliphatic-aromatic polyester, and the polyhydroxyalkanoate.

16. The fiber of any one of the preceding items, wherein the aliphatic-aromatic polyester comprises a $C_2$-$C_{12}$ aliphatic dicarboxylic acid, an aromatic dicarboxylic acid, and an aliphatic $C_2$-$C_{12}$ diol.
17. The fiber of any one of the preceding items, wherein the aliphatic-aromatic polyester is selected from the group consisting of a polybutylene adipate terephthalate (PBAT), a polybutylene succinate terephthalate (PBST), a polybutylene sebacate terephthalate (PBSeT), and any combination thereof.
18. The fiber of any one of the preceding items, wherein the aliphatic-aromatic polyester is a polybutylene adipate terephthalate (PBAT).
19. The fiber of any one of the preceding items, wherein the fiber comprises the aliphatic-aromatic in an amount of from 10 to 60% by weight based on 100% by weight of the combined amount of the aliphatic polyester, the aliphatic-aromatic polyester, and the polyhydroxyalkanoate.
20. The fiber of any one of the preceding items, wherein the polyhydroxyalkanoate comprises a $C_3$-$C_{18}$ hydroxyalkylcarboxylic acid.
21. The fiber of any one of the preceding items, wherein the polyhydroxyalkanoate is selected from the group consisting of a polyhydroxybutyrate, a polyhydroxyvalerate, a polyhydroxybutyrate-co-hydroxyvalerate, a polyhydroxybutyrate-co-hydroxyhexanoate, and any combination thereof.
22. The fiber of any one of the preceding items, wherein the polyhydroxyalkanoate is selected from the group consisting of a poly-3-hydroxybutyrate (P3HB), a poly-4-hydroxybutyrate (P4HB), a poly-3-hydroxyvalerate (PHV), a poly(3-hydroxybutyrate-co-4-hydroxybutyrate), a poly(3-hydroxybutyrate-co-3-hydroxyvalerate) (PHBV), a poly(3-hydroxybutyrate-co-3-hydroxyhexanoate) (PHBH), and any combination thereof.
23. The fiber of any one of the preceding items, wherein the polyhydroxyalkanoate is a polyhydroxybutyrate-co-hydroxyhexanoate, preferably a poly(3-hydroxybutyrate-co-3-hydroxyhexanoate) (PHBH).
24. The fiber of any one of the preceding items, wherein the fiber comprises the polyhydroxyalkanoate in an amount of from 1 to 25% by weight based on 100% by weight of the combined amount of the aliphatic polyester, the aliphatic-aromatic polyester, and the polyhydroxyalkanoate.
25. The fiber of any one of the preceding items, wherein the fiber comprises the aliphatic polyester in an amount of from 42 to 62% by weight, the aromatic-aliphatic polyester in an amount of from 26 to 46% by weight, and the polyhydroxyalkanoate in an amount of from 2 to 22% by weight based on 100% by weight of the combined amount of the aliphatic polyester, the aromatic-aliphatic polyester, and the polyhydroxyalkanoate.

25a. The fiber of any one of the preceding items, wherein the aliphatic polyester is a polybutylene succinate (PBS), the aliphatic-aromatic polyester is a polybutylene adipate terephthalate (PBAT), and the polyhydroxyalkanoate is a poly(3-hydroxybutyrate-co-3-hydroxhexanoate) (PHBH).

26. The fiber of any one of the preceding items, wherein the fiber is a textile fiber.
27. The fiber of any one of the preceding items, wherein the fiber further comprises at least one additive.
28. The fiber of item 27, wherein the at least one additive is selected from the group consisting of a flame retardant, a matting agent, a fluorescence marker, an antimicrobial agent, a filler, and any combination thereof.
29. The fiber of item 28, wherein the additive is a flame retardant.
30. The fiber of item 29, wherein the flame retardant is a phosphate selected from the group consisting of ammonium dihydrogenphosphate ($[NH_4][H_2PO_4]$), di-ammonium hydrogenphosphate ($[NH_4]_2[HPO_4]$), triammonium phosphate ($[NH_4]_3[PO_4]$), ammonium polyphosphate, and any combination thereof.
31. The fiber of item 30, wherein the phosphate is di-ammonium hydrogenphosphate ($[NH_4]_2[HPO_4]$).
32. The fiber of any one of items 27 to 31, wherein the fiber comprises the flame retardant in an amount of from 0.01 to 5% by weight, preferably 0.1 to 4% by weight, more preferably 0.2 to 3% by weight, still more preferably 0.3 to 2% by weight, based on 100% by weight of the total weight of the fiber.
33. The fiber of any one of items 27 to 32, wherein the additive is a matting agent.
34. The fiber of item 33, wherein the matting agent is zinc sulfide.
35. The fiber of any one of items 27 to 34, wherein the additive is a fluorescence marker.
36. The fiber of any one of items 27 to 35, wherein the additive is an antimicrobial agent.
37. The fiber of item 36, wherein the antimicrobial agent is zinc encapsulated with polyethylene terephthalate.
38. The fiber of any one of items 27 to 37, wherein the additive is a filler.
39. The fiber of item 38, wherein the filler is or comprises lignin.
40. The fiber of any one of items 27 to 39, wherein the fiber comprises a total amount of additive(s) of 15% by weight or less, preferably 10% by weight or less, more preferably 7% by weight or less, still more preferably 5% by weight or less, even more preferably 4% by weight or less, even more preferably 3 to 4% by weight, based on 100% by weight of the total weight of the fiber.
41. The fiber of any one of the preceding items, wherein the fiber titer is 0.5 to 8 den, preferably 0.8 to 6 den, more preferably 0.9 to 3 den, still more preferably 1.0 to 2 den, even more preferably 1.0 to 1.5 den, even more preferably 1.1 to 1.2 den.
42. The fiber of any one of the preceding items, wherein the fiber is a staple fiber.
43. The fiber of item 42, wherein the fiber has a staple length of from 2 to 80 mm, preferably of from 5 to 70 mm, more preferably of from 10 to 60 mm, still more preferably of from 15 to 50 mm, even more preferably of from 20 to 40 mm, even more preferably of from 22 to 35 mm, even more preferably of from 25 to 32 mm.
44. The fiber of any one of items 1 to 43, wherein the fiber is a filament.
45. The fiber of any one of the preceding items, wherein the fiber is biodegradable in accordance with EN 13432.
46. A fiber being made from a mixture comprising an aliphatic polyester, an aliphatic-aromatic polyester, and a polyhydroxyalkanoate, wherein the fiber comprises, in a longitudinal direction, two kinds of portions, wherein the one kind of portions are thicker portions and the other kind of portions are thinner portions, wherein said thicker portions and thinner portions extend in a vertical direction relative to the longitudinal direction of the fiber, and wherein an extension in the vertical direction of a thicker portion is greater than an extension in the vertical direction of a thinner portion;

wherein at least a part of the thicker portions has a cavity, and at least a part of the thinner portions has a compact structure.

47. The fiber of item 46, wherein the thicker portions and the thinner portions are arranged in an alternating pattern along the longitudinal direction of the fiber.

48. The fiber of item 46 or 47, wherein the length of the thicker portions and the thinner portions along the longitudinal direction of the fiber is irregular.

49. The fiber of any one of items 46 to 48, wherein an extension of the cavity in a longitudinal direction of the fiber is greater than an extension in a vertical direction relative to the longitudinal direction of the fiber.

50. The fiber of any one of items 46 to 49, wherein the cavity has an irregular circumference.

51. The fiber of item 50, wherein the circumference is irregular in a plane that is conceived in a vertical direction relative to the longitudinal direction of the fiber.

52. The fiber of any one of items 46 to 51, wherein the fiber is a crimped fiber.

53. The fiber of any one of items 46 to 52, wherein the fiber is a fiber of any one of items 1 to 45.

54. A hollow fiber being made from a mixture comprising an aliphatic polyester, an aliphatic-aromatic polyester, and a polyhydroxyalkanoate.

55. The hollow fiber of item 55, wherein the hollow fiber is further defined as in any one of items 4 to 39.

56. A yarn comprising a fiber of any one of items 1 to 55.

57. A textile comprising a fiber of any one of items 1 to 55 or a yarn of item 56.

58. The textile of item 57, wherein the textile is a clothing or a home textile.

59. The textile of item 58, wherein the clothing is selected from the group consisting of a shirt, a polo shirt, a pair of trouser, a jacket, underwear, socks, a coat, a shoe and shoe laces, 60. The textile of item 58, wherein the home textile is selected from the group consisting of a curtain, a rug, a blanket, a bedsheet, a duvet, a duvet cover, a cushion cover and a towel.

61. A method of preparing a fiber according to any one of items 1 to 54, comprising: spinning a melt comprising an aliphatic polyester, an aliphatic-aromatic polyester, and a polyhydroxyalkanoate through a hollow fiber spinning nozzle to obtain a precursor fiber; and cooling the precursor fiber under a temperature gradient, thereby obtaining the fiber.

62. The method of item 61, wherein the temperature gradient is generated by cooling the precursor fiber from one side.

63. The method of item 61 or 62, wherein the cooling is effected by air cooling.

64. The method of any one of items 61 to 64, wherein the melt comprises the aliphatic polyester in an amount of from 30 to 70% by weight based on 100% by weight of the combined amount of the aliphatic polyester, the aliphatic-aromatic polyester, and the polyhydroxyalkanoate.

65. The method of any one of items 61 to 64, wherein the melt comprises the aliphatic-aromatic in an amount of from 10 to 60% by weight based on 100% by weight of the combined amount of the aliphatic polyester, the aliphatic-aromatic polyester, and the polyhydroxyalkanoate.

66. The method of any one of items 61 to 65, wherein the melt comprises the polyhydroxyalkanoate in an amount of from 1 to 25% by weight based on 100% by weight of the combined amount of the aliphatic polyester, the aliphatic-aromatic polyester, and the polyhydroxyalkanoate.

67. The method of any one of items 61 to 66, wherein the melt comprises the aliphatic polyester in an amount of from 42 to 62% by weight, the aromatic-aliphatic polyester in an amount of from 26 to 46% by weight, and the polyhydroxyalkanoate in an amount of from 2 to 22% by weight based on 100% by weight of the combined amount of the aliphatic polyester, the aromatic-aliphatic polyester, and the polyhydroxyalkanoate.

68. The method of any one of items 61 to 67, wherein the melt further comprises at least an additive.

69. The method of item 68, wherein the at least additive is selected from the group consisting of a flame retardant, a matting agent, a fluorescence marker, an antimicrobial agent, a filler, and any combination thereof.

70. The method of item 69, wherein the additive is a flame retardant.

71. The method of item 70, wherein the melt comprises the flame retardant in an amount of from 0.01 to 5% by weight, preferably 0.1 to 4% by weight, more preferably 0.2 to 3% by weight, still more preferably 0.3 to 2% by weight, based on 100% by weight of the total weight of the melt.

72. The method of any one of items 68 to 71, wherein the total amount of additive(s) is 15% by weight or less, preferably 10% by weight or less, more preferably 7% by weight or less, still more preferably 5% by weight or less, even more preferably 4% by weight or less, even more preferably 3 to 4% by weight, based on 100% by weight of the total weight of the melt.

73. The method of any one of items 61 to 72, wherein the fiber is prepared as a staple fiber.

74. The method of any one of items 61 to 72, wherein the fiber is prepared as a filament.

75. Use of a melt comprising an aliphatic polyester, an aliphatic-aromatic polyester, and a polyhydroxyalkanoate for the preparation of a fiber, wherein the fiber is defined as in any one of items 1 to 53.

76. Use of a melt comprising an aliphatic polyester, an aliphatic-aromatic polyester, and a polyhydroxyalkanoate for the preparation of a hollow fiber.

77. A mixture comprising an aliphatic polyester, and aliphatic-aromatic polyester, and a polyhydroxyalkanoate.

78. The mixture of item 77, wherein the aliphatic polyester, the aliphatic-aromatic polyester, and the polyhydroxyalkanoate is further defined as in any one of items 11 to 25.

79. The mixture of item 77 or 78, wherein the aliphatic polyester is a polybutylene succinate (PBS), the aliphatic-aromatic polyester is a polybutylene adipate terephthalate (PBAT), and the polyhydroxyalkanoate is a poly(3-hydroxybutyrate-co-3-hydroxhexanoate) (PHBH).

80. The mixture of any one of items 77 to 79, wherein the aliphatic polyester, the aliphatic-aromatic polyester, and the polyhydroxyalkanoate is present in the form of particles.
81. The mixture of item 80, wherein the particles are selected from the group consisting of granules, pellets, extrudates, beads, prills, and any combination thereof.
82. The mixture of item 80 or item 81, wherein the aliphatic polyester, the aliphatic-aromatic polyester, and the polyhydroxyalkanoate is in the form or granules.
83. The mixture of any one of items 77 to 82, wherein the mixture comprises the aliphatic polyester in an amount of from 30 to 70% by weight based on 100% by weight of the combined amount of the aliphatic polyester, the aliphatic-aromatic polyester, and the polyhydroxyalkanoate.
84. The mixture of items 77 to 83, wherein the mixture comprises the aliphatic-aromatic polyester in an amount of from 10 to 60% by weight based on 100% by weight of the combined amount of the aliphatic polyester, the aliphatic-aromatic polyester, and the polyhydroxyalkanoate.
85. The mixture of any one of items 77 to 84, wherein the mixture comprises the polyhydroxyalkanoate in an amount of from 1 to 25% by weight based on 100% by weight of the combined amount of the aliphatic polyester, the aliphatic-aromatic polyester, and the polyhydroxyalkanoate.
86. The mixture of any one of items 77 to 85, wherein the mixture comprises the aliphatic polyester in an amount of from 42 to 62% by weight, the aromatic-aliphatic polyester in an amount of from 26 to 46% by weight, and the polyhydroxyalkanoate in an amount of from 2 to 22% by weight based on 100% by weight of the combined amount of the aliphatic polyester, the aromatic-aliphatic polyester, and the polyhydroxyalkanoate.
87. The mixture of any one of items 77 to 86, wherein the mixture further comprises at least one additive.
88. The mixture of item 87, wherein the at least additive is selected from the group consisting of a flame retardant, a matting agent, a fluorescence marker, an antimicrobial agent, a filler, and any combination thereof.
89. The mixture of item 88, wherein the additive is a flame retardant.
90. The mixture of item 89, wherein the mixture comprises the flame retardant in an amount of from 0.01 to 5% by weight, preferably 0.1 to 4% by weight, more preferably 0.2 to 3% by weight, still more preferably 0.3 to 2% by weight, based on 100% by weight of the total weight of the mixture.
91. The mixture of any one of items 87 to 90, wherein the total amount of additive(s) is 15% by weight or less, preferably 10% by weight or less, more preferably 7% by weight or less, still more preferably 5% by weight or less, even more preferably 4% by weight or less, even more preferably 3 to 4% by weight, based on 100% by weight of the total weight of the mixture.
92. Use of a mixture comprising an aliphatic polyester, an aliphatic-aromatic polyester, and a polyhydroxyalkanoate for the preparation of a fiber, wherein the fiber is defined as in any one of items 1 to 76.
93. Use of a mixture comprising an aliphatic polyester, an aliphatic-aromatic polyester, and a polyhydroxyalkanoate for the preparation of a hollow fiber.

What is claimed is:

1. A method of preparing a fiber, comprising:
spinning a melt comprising an aliphatic polyester, an aliphatic-aromatic polyester, and a polyhydroxyalkanoate through a hollow fiber spinning nozzle to obtain a precursor fiber; and
cooling the precursor fiber under a temperature gradient, thereby obtaining the fiber, wherein the temperature gradient is generated by cooling the precursor fiber from one side.

2. The method of claim 1, wherein the temperature gradient is generated by one or more temperature control elements.

3. The method of claim 2, wherein the one or more temperature control elements are arranged so that the precursor fiber is cooled from one side.

4. The method of claim 1, wherein the aliphatic polyester comprises an aliphatic $C_2$-$C_{20}$ dicarboxylic acid and an aliphatic $C_2$-$C_{12}$ diol,
wherein the aliphatic-aromatic polyester comprises a $C_2$-$C_{12}$ aliphatic dicarboxylic acid, an aromatic dicarboxylic acid, and an aliphatic $C_2$-$C_{12}$ diol, and
wherein the polyhydroxyalkanoate comprises a $C_3$-$C_{18}$ hydroxyalkylcarboxylic acid.

5. The method of claim 1, wherein the fiber comprises the aliphatic polyester in an amount of from 30 to 70% by weight,
the aliphatic-aromatic polyester in an amount of from 10 to 60% by weight, and
the polyhydroxyalkanoate in an amount of from 1 to 25% by weight,
based on 100% by weight of the combined amount of the aliphatic polyester, the aliphatic-aromatic polyester, and the polyhydroxyalkanoate.

6. The method of claim 1, wherein the fiber comprises the aliphatic polyester in an amount of from 42 to 62% by weight,
the aliphatic-aromatic polyester in an amount of from 26 to 46% by weight, and
the polyhydroxyalkanoate in an amount of from 2 to 22% by weight,
based on 100% by weight of the combined amount of the aliphatic polyester, the aliphatic-aromatic polyester, and the polyhydroxyalkanoate.

7. The method of claim 1, wherein the aliphatic polyester is a polybutylene succinate (PBS), the aliphatic-aromatic polyester is a polybutylene adipate terephthalate (PBAT), and the polyhydroxyalkanoate is a poly(3-hydroxybutyrate-co-3-hydroxyhexanoate) (PHBH).

8. A fiber being made from a mixture comprising an aliphatic polyester, an aliphatic-aromatic polyester, and a polyhydroxyalkanoate,
wherein the fiber comprises, in a longitudinal direction, two types of portions,
wherein the one type of portions are thicker portions and the other type of portions are thinner portions,
wherein said thicker portions and thinner portions extend in a vertical direction relative to the longitudinal direction of the fiber,
wherein an extension in the vertical direction of a thicker portion is greater than an extension in the vertical direction of a thinner portion; and
wherein at least a part of the thicker portions has a cavity, and at least a part of the thinner portions has a compact structure.

9. The fiber of claim 8, wherein the thicker portions and the thinner portions are arranged in an alternating pattern along the longitudinal direction of the fiber.

10. The fiber of claim 8, wherein the aliphatic polyester comprises an aliphatic $C_2$-$C_{20}$ dicarboxylic acid and an aliphatic $C_2$-$C_{12}$ diol, wherein the aliphatic-aromatic polyester comprises a $C_2$-$C_{12}$ aliphatic dicarboxylic acid, an aromatic dicarboxylic acid, and an aliphatic $C_2$-$C_{12}$ diol, and wherein the polyhydroxyalkanoate comprises a $C_3$-$C_{18}$ hydroxyalkylcarboxylic acid.

11. The fiber of claim 8, wherein the fiber comprises the aliphatic polyester in an amount of from 30 to 70% by weight, the aliphatic-aromatic polyester in an amount of from 10 to 60% by weight, and the polyhydroxyalkanoate in an amount of from 1 to 25% by weight, based on 100% by weight of the combined amount of the aliphatic polyester, the aliphatic-aromatic polyester, and the polyhydroxyalkanoate.

12. The fiber of claim 8, wherein the fiber comprises the aliphatic polyester in an amount of from 42 to 62% by weight, the aliphatic-aromatic polyester in an amount of from 26 to 46% by weight, and the polyhydroxyalkanoate in an amount of from 2 to 22% by weight, based on 100% by weight of the combined amount of the aliphatic polyester, the aliphatic-aromatic polyester, and the polyhydroxyalkanoate.

13. The fiber of claim 8, wherein the aliphatic polyester is a polybutylene succinate (PBS), the aliphatic-aromatic polyester is a polybutylene adipate terephthalate (PBAT), and the polyhydroxyalkanoate is a poly(3-hydroxybutyrate-co-3-hydroxhexanoate) (PHBH).

14. The fiber of claim 8, wherein the fiber is biodegradable.

15. A mixture comprising an aliphatic polyester, an aliphatic-aromatic polyester, and a polyhydroxyalkanoate, wherein the mixture comprises the aliphatic polyester in an amount of from 30 to 70% by weight, the aliphatic-aromatic polyester in an amount of from 10 to 60% by weight, and the polyhydroxyalkanoate in an amount of from 1 to 25% by weight based on 100% by weight of the combined amount of the aliphatic polyester, the aliphatic-aromatic polyester, and the polyhydroxyalkanoate.

16. The mixture of claim 15, wherein the mixture comprises the aliphatic polyester in an amount of from 42 to 62% by weight, the aliphatic-aromatic polyester in an amount of from 26 to 46% by weight, and the polyhydroxyalkanoate in an amount of from 2 to 22% by weight based on 100% by weight of the combined amount of the aliphatic polyester, the aliphatic-aromatic polyester, and the polyhydroxyalkanoate.

17. The mixture of claim 15, wherein the aliphatic polyester is a polybutylene succinate (PBS), the aliphatic-aromatic polyester is a polybutylene adipate terephthalate (PBAT), and the polyhydroxyalkanoate is a poly(3-hydroxybutyrate-co-3-hydroxyhexanoate) (PHBH).

18. The mixture of claim 15, wherein the mixture of the aliphatic polyester, the aliphatic-aromatic polyester, and the polyhydroxyalkanoate is in the form of granules.

19. The mixture of claim 15, wherein the mixture of the aliphatic polyester, the aliphatic-aromatic polyester, and the polyhydroxyalkanoate is in the form of a melt.

* * * * *